(12) United States Patent
Kim et al.

(10) Patent No.: US 10,810,292 B2
(45) Date of Patent: Oct. 20, 2020

(54) ELECTRONIC DEVICE AND METHOD FOR STORING FINGERPRINT INFORMATION

(71) Applicant: Samsung Electronics Co., Ltd., Gyeonggi-do (KR)

(72) Inventors: Hyeonho Kim, Gyeongsangbuk-do (KR); Kwonseung Shin, Gyeonggi-do (KR); Siwoo Lee, Gyeongsangbuk-do (KR); Jeongseob Kim, Daegu (KR); Yonggil Han, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 232 days.

(21) Appl. No.: 15/948,478

(22) Filed: Apr. 9, 2018

(65) Prior Publication Data

US 2018/0293370 A1    Oct. 11, 2018

(30) Foreign Application Priority Data

Apr. 7, 2017    (KR) .................. 10-2017-0045479

(51) Int. Cl.
*G06F 21/32* (2013.01)
*G06K 9/00* (2006.01)
*G06F 21/45* (2013.01)

(52) U.S. Cl.
CPC .............. *G06F 21/32* (2013.01); *G06F 21/45* (2013.01); *G06K 9/00926* (2013.01)

(58) Field of Classification Search
CPC ...... G06F 21/32; G06F 21/45; G06K 9/00926
(Continued)

(56) References Cited

U.S. PATENT DOCUMENTS 9,116,645 B1 *  8/2015  Klappert .......... H04N 21/42201
9,471,765 B1 * 10/2016  Setterberg .......... G06K 9/00026
(Continued)

FOREIGN PATENT DOCUMENTS

JP    2008-217442    9/2008
KR    10-2011-0018130    2/2011
KR    10-1244220    3/2013

OTHER PUBLICATIONS

Umut Uludag et al., "Biometric Template Selection and Update: A Case Study in Fingerprints", The Journal of the Pattern Recognition Society, Jul. 1, 2004, 10 pages.
(Continued)

*Primary Examiner* — Shin-Hon (Eric) Chen
*Assistant Examiner* — Dereena T Cattungal
(74) *Attorney, Agent, or Firm* — The Farrell Law Firm, P.C.

(57) ABSTRACT

An electronic device is provided. The electronic device includes a memory storing first authenticated fingerprint information, and a processor configured to obtain first fingerprint information corresponding to a first input, compare the first fingerprint information with the first authenticated fingerprint information during a first user authentication, perform a designated function when the first authenticated fingerprint information belongs to a first reference, temporarily store the first fingerprint information when the first authenticated fingerprint information belongs to a second reference, obtain second fingerprint information corresponding to a second input during a second user authentication, compare the second fingerprint information with the first authenticated fingerprint information during the second user authentication when the second input satisfies a designated reference in relation to the first input, store the temporarily stored first fingerprint information as second authenticated fingerprint information when the second authenticated fin- (Continued)

gerprint information belongs to the first reference, and perform the designated function.

19 Claims, 21 Drawing Sheets

(58) Field of Classification Search
USPC .......................................................... 726/19
See application file for complete search history.

(56) References Cited

U.S. PATENT DOCUMENTS

| | | | |
|---|---|---|---|
| 10,083,287 B2* | 9/2018 | Kwon | G06F 1/1684 |
| 10,261,804 B2* | 4/2019 | Abudi | G06F 3/0484 |
| 2008/0089563 A1* | 4/2008 | Yumoto | G06K 9/00087 |
| | | | 382/124 |
| 2010/0092048 A1* | 4/2010 | Pan | G06K 9/00093 |
| | | | 382/125 |
| 2011/0037563 A1 | 2/2011 | Choi et al. | |
| 2013/0100267 A1 | 4/2013 | Baek | |
| 2013/0167212 A1* | 6/2013 | Azar | G06F 21/32 |
| | | | 726/7 |
| 2014/0020090 A1* | 1/2014 | Nada | G06K 9/036 |
| | | | 726/19 |
| 2014/0030090 A1* | 1/2014 | Kammer | F03D 7/00 |
| | | | 416/1 |
| 2015/0074615 A1* | 3/2015 | Han | H04L 63/0861 |
| | | | 715/863 |
| 2015/0116086 A1* | 4/2015 | Kim | G06F 21/32 |
| | | | 340/5.83 |
| 2015/0127965 A1* | 5/2015 | Hong | G06F 1/1694 |
| | | | 713/323 |
| 2016/0042247 A1* | 2/2016 | Russo | G06K 9/6202 |
| | | | 382/125 |
| 2016/0307023 A1* | 10/2016 | Kim | G06K 9/00067 |
| 2017/0039410 A1* | 2/2017 | Pi | G06F 3/011 |
| 2017/0372051 A1* | 12/2017 | Lee | H04L 9/3231 |
| 2018/0008171 A1* | 1/2018 | Lee | G07C 9/00563 |

OTHER PUBLICATIONS

European Search Report dated Aug. 23, 2018 issued in counterpart application No. 18164698.5-1213, 11 pages.

* cited by examiner

ELECTRONIC DEVICE AND METHOD FOR STORING FINGERPRINT INFORMATION

CROSS-REFERENCE TO RELATED APPLICATION(S)

This application is based on and claims priority under 35 U.S.C. § 119(a) to Korean Patent Application Serial number 10-2017-0045479, filed on Apr. 7, 2017 in the Korean Intellectual Property Office, the entire disclosure of which is incorporated herein by reference.

BACKGROUND

1. Field

The disclosure relates, generally, to an electronic device, and more particularly, to an electronic device and method that can store a user's fingerprint information to enhance a fingerprint authentication success rate of the user of the electronic device.

2. Description of the Related Art

Electronic devices, such as a mobile terminal, can perform various functions.

In order to protect a user's personal or private information, the electronic device may include one or more security features.

For example, the electronic device may use a user authentication method for recognizing user biometric information. Such a user authentication method may include using user fingerprint information.

Typically, an electronic device compares fingerprint information with fingerprint information that was previously inputted and stored in a memory of the electronic device, and performs authentication based on a similarity or a match of the fingerprint information. If the fingerprint information does not match with the previously stored fingerprint information, according to a fingerprint input area and direction, the electronic device may not recognize the fingerprint input of the authenticated user.

Fingerprint information in which the user stores and registers at the memory in order to perform security authentication may not cover information about a user's entire fingerprint because of issues associated with a posture, direction, or a number when the user initially registers a fingerprint.

SUMMARY

The present disclosure has been made to address at least the disadvantages described above and to provide at least the advantages described below.

Accordingly, an aspect of the present disclosure provides an electronic device and method that can store fingerprint information that can enhance a fingerprint authentication success rate of an electronic device user by additionally registering a fingerprint in which similarity or a match of an input fingerprint failed in security authentication meets a predetermined threshold for future comparison fingerprint information to perform authentication, when inputting a user fingerprint for authentication of the electronic device.

In accordance with an aspect of the disclosure, there is provided an electronic device. The electronic device includes a memory configured to store first authenticated fingerprint information, a display, a fingerprint sensor operably coupled to the display, and a processor configured to obtain first fingerprint information corresponding to a first input received using the fingerprint sensor, compare the first fingerprint information with the first authenticated fingerprint information during a first user authentication, perform a designated function when the first authenticated fingerprint information belongs to a first reference, temporarily store the first fingerprint information in the memory when the first authenticated fingerprint information belongs to a second reference, obtain second fingerprint information corresponding to a second input during a second user authentication, compare the second fingerprint information with the first authenticated fingerprint information during the second user authentication when the second input satisfies a designated reference in relation to the first input, store the temporarily stored first fingerprint information as second authenticated fingerprint information when the second authenticated fingerprint information belongs to the first reference, and perform the designated function.

In accordance with an aspect of the disclosure, there is provided a method of controlling fingerprint information in an electronic device including a memory configured to store first authenticated fingerprint information, a display, a fingerprint sensor operably coupled to the display, and a processor. The method includes obtaining, by the processor, first fingerprint information corresponding to a first input received using the fingerprint sensor, comparing, by the processor, the first fingerprint information with the first authenticated fingerprint information in relation to a first user authentication, performing, by the processor, a designated function when the first authenticated information belongs to a first reference, and temporarily storing, by the processor, the first fingerprint information in the memory when the first authenticated fingerprint information belongs to a second reference, obtaining second fingerprint information corresponding to a second input in relation to a second user authentication, comparing the second fingerprint information with second authenticated fingerprint information when the second input satisfies a designated reference in relation to the first input, storing the temporarily stored first fingerprint information as the second authenticated fingerprint information when the second authenticated fingerprint information belongs to the first reference, and performing the designated function.

In accordance with an aspect of the disclosure, there is provided a nontransitory computer readable recording medium having stored thereon instructions that when executed cause an electronic device including a memory configured to store first authenticated fingerprint information, a display, a fingerprint sensor operably coupled to the display, and a processor to perform a method including obtaining, by the processor, first fingerprint information corresponding to a first input received using the fingerprint sensor, comparing, by the processor, the first fingerprint information with the first authenticated fingerprint information in relation to a first user authentication, performing, by the processor, a designated function when the first authenticated information belongs to a first reference, and temporarily storing, by the processor, the first fingerprint information in the memory when the first authenticated fingerprint information belongs to a second reference, obtaining second fingerprint information corresponding to a second input in relation to a second user authentication, comparing the second fingerprint information with second authenticated fingerprint information when the second input satisfies a designated reference in relation to the first input, storing the temporarily stored first fingerprint information as the second authenticated fingerprint information when the second authenticated fingerprint information belongs to the first reference, and performing the designated function.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
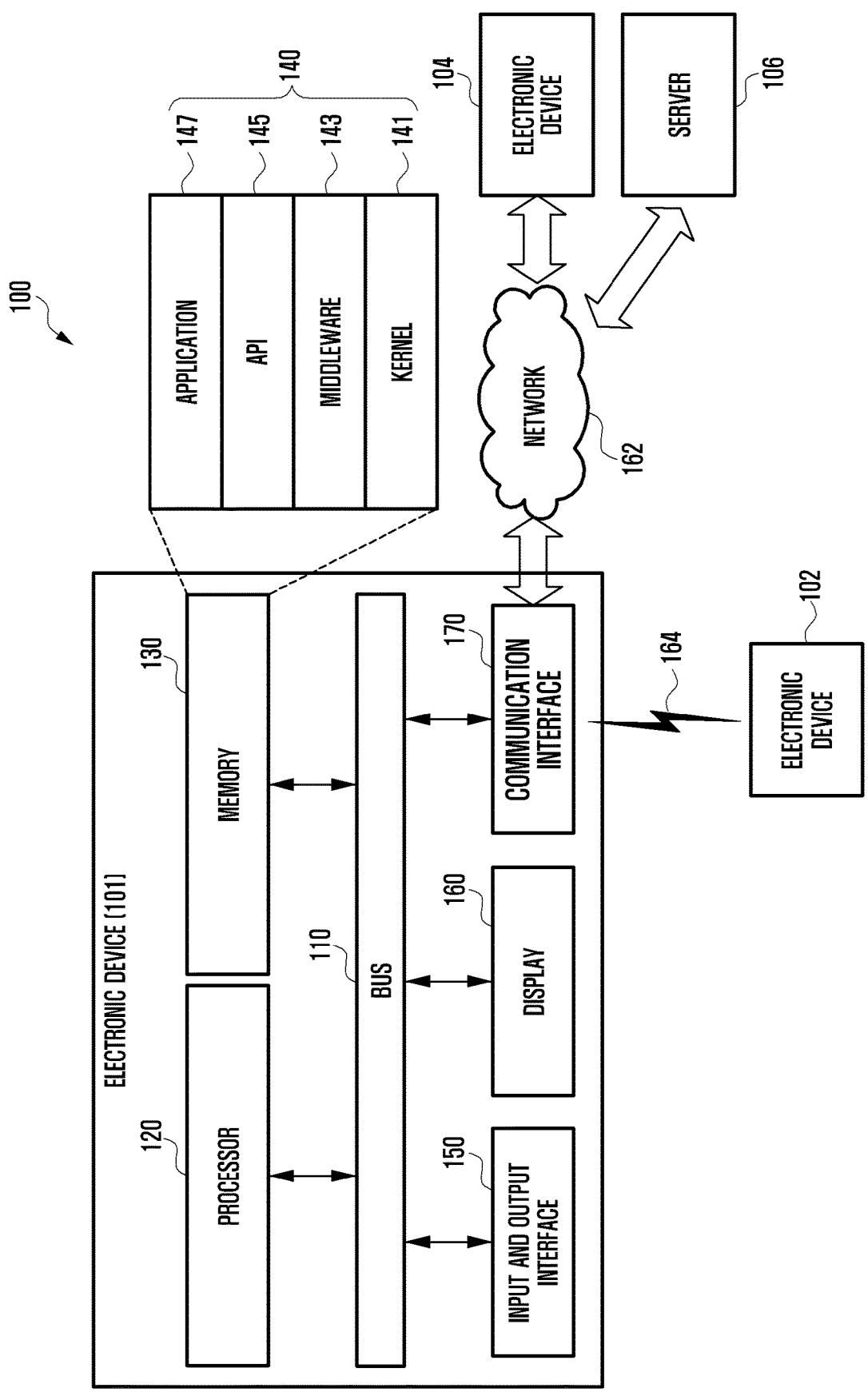
FIG. 1 is a diagram of a network environment including an electronic device, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram of a network environment including an electronic device, according to an embodiment disclosure.

Referring to FIG. 1, a network environment 100 includes an electronic device 101 having a bus 110, a processor 120, a memory 130, an input/output interface 150, a display 160, and a communication interface 170. At least one of the above described components may be omitted from the electronic device 101 or another component may be further included in the electronic device 101.

The bus 110 may be a circuit connecting the above described components 120, 130, and 150-170 and transmitting communications (e.g., control messages and/or data) between the above described components.

The processor 120 may include one or more of a CPU, AP, and a communication processor (CP). The processor 120 is capable of controlling at least one of other components of the electronic device 101 and/or processing data or operations related to communication.

The memory 130 may include volatile memory and/or non-volatile memory. The memory 130 is capable of storing data or commands/instructions related to at least one of other components of the electronic device 101. The memory 130 is capable of storing software and/or a program module 140. For example, the program 140 may include a kernel 141, middleware 143, an application programming interface (API) 145, application programs (or applications) 147, etc. The kernel 141, the middleware 143 or at least part of the API 145 may be called an operating system (OS).

The kernel 141 is capable of controlling or managing system resources (e.g., the bus 110, the processor 120, the memory 130, etc.) used to execute operations or functions of other programs (e.g., the middleware 143, the API 145, and the applications 147). The kernel 141 provides an interface capable of allowing the middleware 143, the API 145, and the applications 147 to access and control/manage the individual components of the electronic device 101.

The middleware 143 may be an interface between the API 145 or the applications 147 and the kernel 141 so that the API 145 or the applications 147 can communicate with the kernel 141 and exchange data therewith. The middleware 143 is capable of processing one or more task requests received from the applications 147 according to the priority. The middleware 143 is capable of assigning a priority for use of system resources of the electronic device 101 (e.g., the bus 110, the processor 120, the memory 130, etc.) to the application 147. The middleware 143 processes one or more task requests according to a priority assigned to at least one application program, thereby performing scheduling or load balancing for the task requests.

The API 145 may be an interface that is configured to allow the applications 147 to control functions provided by the kernel 141 or the middleware 143. The API 145 may include at least one interface or function (e.g., instructions) for file control, window control, image process, text control, or the like.

The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 may include a liquid crystal display (LCD), a flexible display, a transparent display, a light emitting diode (LED) display, an organic LED (OLED) display, micro-electro-mechanical systems (MEMS) display, an electronic paper display, etc. The display 160 is capable of displaying various types of content (e.g., texts, images, videos, icons, symbols, etc.). The display 160 may also be implemented with a touch screen. The display 160 is capable of receiving touches, gestures, proximity inputs or hovering inputs, via a stylus pen, or a user's body.

The communication interface 170 is capable of establishing communication between the electronic device 101 and an external device connected to a network 162 via wired or wireless communication.

Wireless communication may employ, as cellular communication protocol, at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 164. Short-wireless communication 164 may include at least one of wireless fidelity (Wi-Fi), bluetooth (BT), near field communication (NFC), magnetic secure transmission (MST), and global navigation satellite system (GNSS). The GNSS may include at least one of a global positioning system (GPS), global navigation satellite system (Glonass), Beidou NSS (Beidou), Galileo, the European global satellite-based navigation system, according to GNSS using areas, bandwidths, etc. In the disclosure, "GPS" and "GNSS" may be used interchangeably. Wired communication may include at least one of universal serial bus (USB), high definition multimedia interface (HDMI), recommended standard 232 (RS-232), and plain old telephone service (POTS). The network 162 may include at least one of a telecommunications network, e.g., a computer network (e.g., local area network (LAN) or wide area network (WAN)), the Internet, and a telephone network.

A first external electronic device 102 and a second external electronic device 104 are each identical to or different from the electronic device 101, in terms of type. A server 106 is capable of including a group of one or more servers. Part or all of the operations executed on the electronic device 101 may be executed the electronic devices 102 and 104 or a server 106. When the electronic device needs to perform a function or service automatically or according to a request, it does not perform the function or service, but is capable of additionally requesting at least part of the function related to the function or service from the electronic devices 102 and 104 or a server 106. The electronic devices 102 and 104 or the server 106 are capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
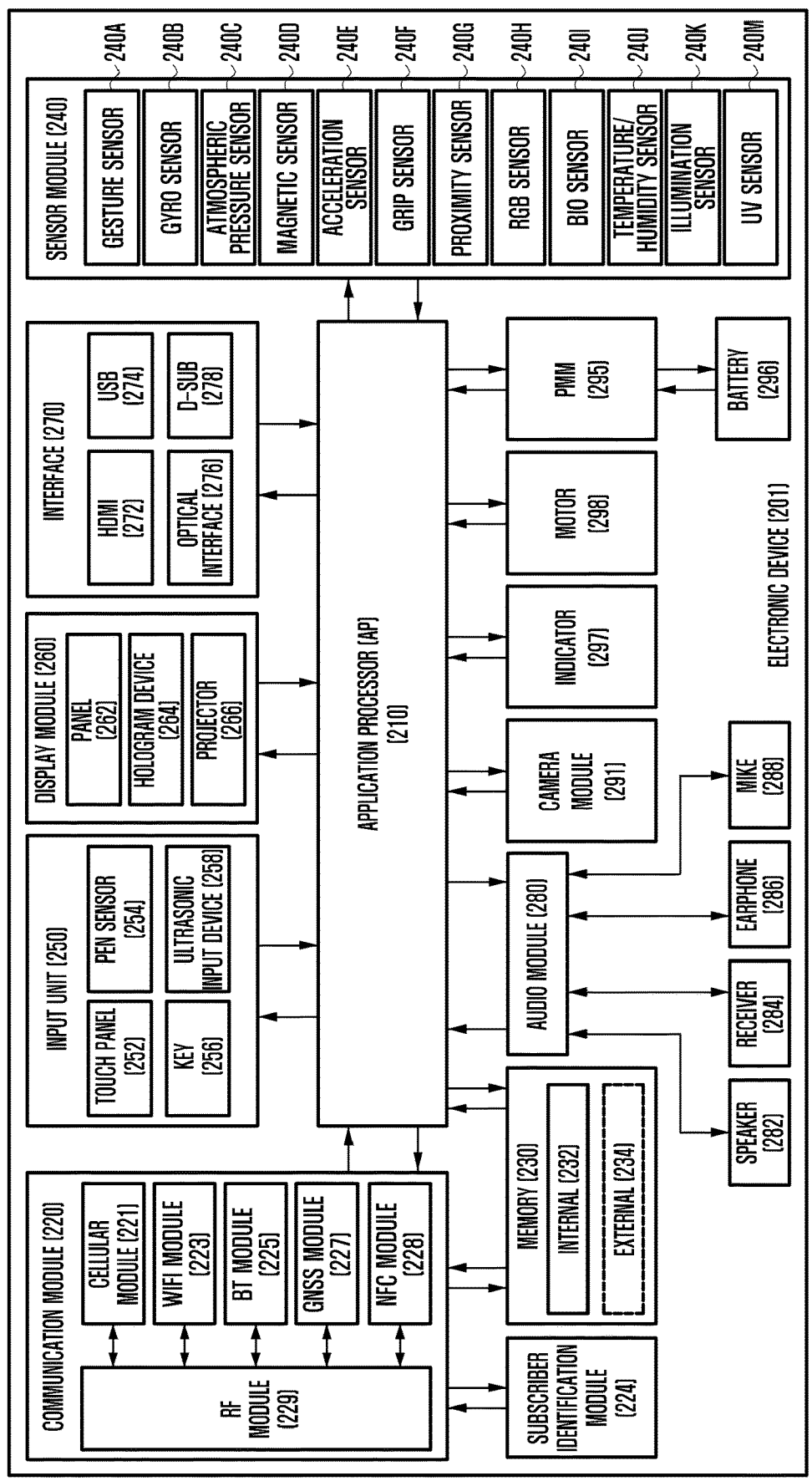
FIG. 2 is a diagram of a configuration of an electronic device, according to an embodiment.

FIG. 2 is a diagram of an electronic device, according to an embodiment disclosure.

Referring to FIG. 2, an electronic device 201 may include a part or all of the components in the electronic device 101 shown in FIG. 1. The electronic device 201 may include one or more processors 210 (e.g., APs), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving an OS or an application program to control a plurality of hardware or software components connected to the processor 210, processing various data, and performing operations. The processor 210 may be implemented as a system on chip (SoC). The processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. The communication module 170 is capable of including the cellular module 221, a Wi-Fi module 223, a BT module 225, a GNSS module 227 (e.g., a GPS module, Glonass module, Beidou module or Galileo module), an NFC module 228, and a radio frequency (RF) module 229.

The cellular module 221 is capable of providing a voice call, a video call, an SMS service, an Internet service, etc., through a communication network. The cellular module 221 is capable of identifying and authenticating an electronic device 201 in a communication network by using the SIM 224. The cellular module 221 is capable of performing at least a part of the functions provided by the processor 210, and may include a CP.

Each of the Wi-Fi module 223, the BT module 225, the GNSS module 227, and the NFC module 228 may include a processor for processing data transmitted or received through the corresponding module. At least part of the cellular module 221, Wi-Fi module 223, BT module 225, GNSS module 227, and NFC module 228 (e.g., two or more modules) may be included in one integrated chip (IC) or one IC package.

The RF module 229 is capable of transmission/reception of communication signals, e.g., RF signals. The RF module 229 is capable of including a transceiver, a power amplifier module (PAM), a frequency filter, a low noise amplifier (LNA), an antenna, etc. At least one of the cellular module 221, the Wi-Fi module 223, the BT module 225, the GNSS module 227, and the NFC module 228 is capable of transmission/reception of RF signals through a separate RF module.

The memory 230 may include a built-in or internal memory 232 or an external memory 234. The built-in memory 232 is capable of including at least one of a volatile memory, e.g., a dynamic random access memory (DRAM), a static RAM (SRAM), a synchronous dynamic RAM (SDRAM), etc. and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 may be connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and an ultraviolet (UV) sensor 240M. Additionally or alternatively, the sensor module 240 may also include an e-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling one or more sensors included therein. The electronic device 201 may include a processor, configured as part of the processor 210 or a separate component, for controlling the sensor module 240. While the processor 210 is operating in sleep mode, the processor 210 is capable of controlling the sensor module 240.

The input device 250 may include a touch panel 252, a (digital) pen sensor 254, a key 256, or an ultrasonic input unit 258. The touch panel 252 may be implemented with at least one of a capacitive touch system, a resistive touch system, an infrared touch system, and an ultrasonic touch system. The touch panel 252 may further include a control circuit, and the touch panel 252 may include a tactile layer to provide a tactile response to the user. The (digital) pen sensor 254 may be implemented with a part of the touch panel 252 or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 may include a panel 262, a hologram unit 264, or a projector 266. The panel 262 may include the same or similar components as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. The display 260 may further include a control circuit for controlling the panel 262, the hologram unit 264, or the projector 266.

The interface 270 may include an HDMI 272, a USB 274, an optical interface 276, or a d-subminiature (D-sub) 278.

The interface 270 may be included in the communication interface 170 shown in FIG. 1. Additionally or alternatively, the interface 270 may include a mobile high-definition link (MHL) interface, a SD card/MMC interface, or an Infrared Data Association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, the microphone 288, etc.

The camera module 291 is a device capable of taking both still and moving images. The camera module 291 may include one or more image sensors (e.g., a front image sensor or a rear image sensor), a lens, an image signal processor (ISP), a flash (e.g., an LED or xenon lamp), etc.

The power management module 295 is capable of managing power of the electronic device 201. The power management module 295 may include a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge is capable of measuring the residual capacity, charge in voltage, current, or temperature of the battery 296.

The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. The electronic device 201 may also include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or MediaFlo™, etc.

Figure 3:
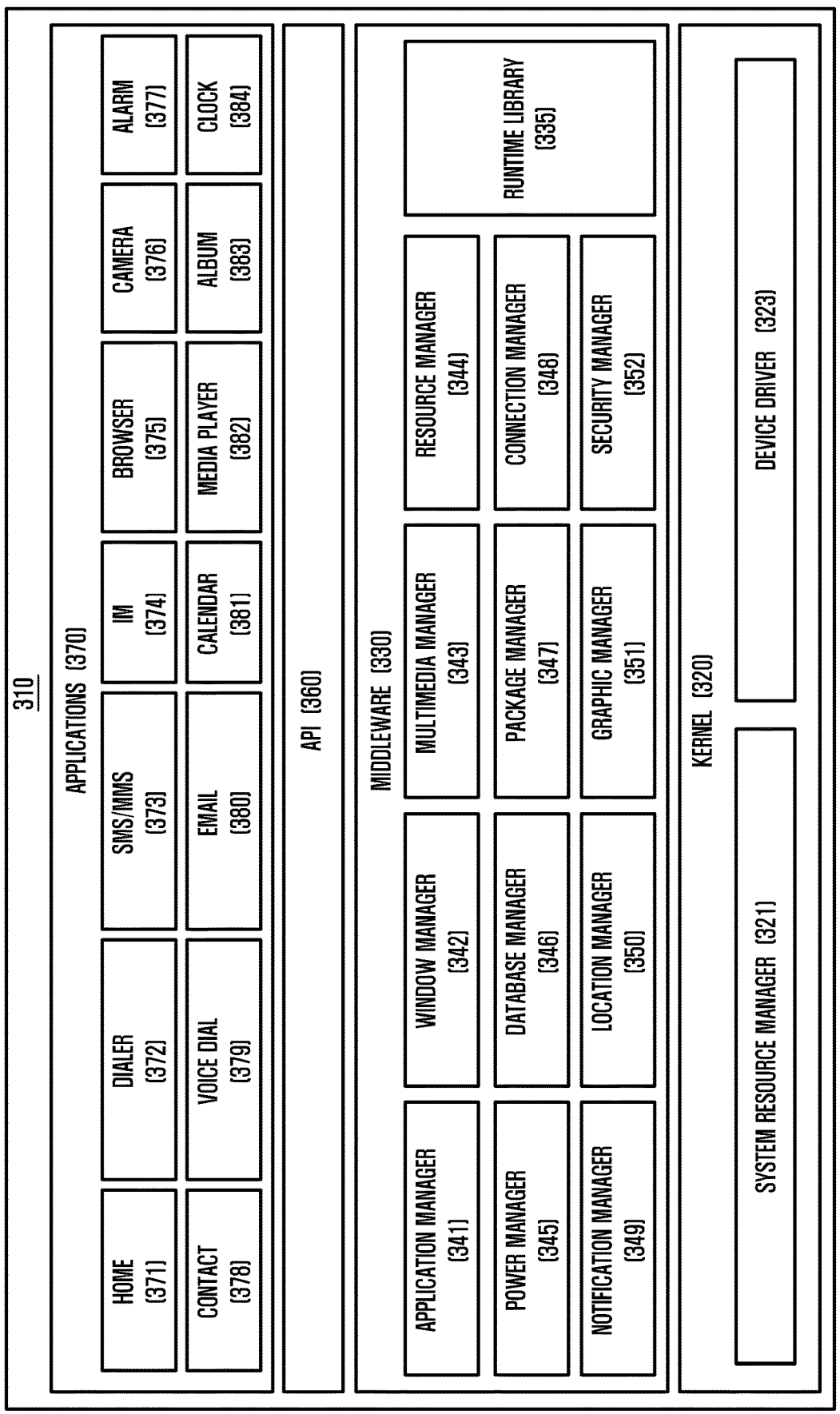
FIG. 3 is a diagram of a configuration of a program module, according to an embodiment.

FIG. 3 is a diagram of a programming module, according to an embodiment disclosure.

Referring to FIG. 3, a program module 310 is capable of including an OS for controlling resources related to an electronic device (e.g., electronic device 101) and/or various applications (e.g., application 147) running on the OS. The OS may be Android™, iOS™, Windows™, Symbian™, Tizen™, Bada™, etc.

The program module 310 is capable of including a kernel 320, middleware 330, an API 360 and/or applications 370. At least part of the program module 310 may be preloaded on the electronic device or downloaded from a server (e.g., an electronic device 102 or 104, server 106, etc.).

The kernel 320 may include a system resource manager 321 and/or a device driver 323. The system resource manager 321 may include a process manager, a memory manager, and a file system manager. The system resource manager 321 may perform a system resource control, allocation, and recall. The device driver 323 may include a display driver, a camera driver, a BT driver, a shared memory driver, a USB driver, a keypad driver, a Wi-Fi driver, and an audio driver. Further, the device driver 323 may include an inter-process communication (IPC) driver.

The middleware 330 may provide a function required in common by the applications 370. Further, the middleware 330 may provide a function through the API 360 to allow the applications 370 to efficiently use limited system resources within the electronic device. The middleware 330 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. Furthermore, although not shown, the middleware 330 may also include a payment manager.

The runtime library 335 may include a library module used by a complier to add a new function through a programming language while the applications 370 are executed. The runtime library 335 executes input and output, management of a memory, a function associated with an arithmetic function and the like.

The application manager 341 may manage a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a basic input/output system (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage a wireless connection such as Wi-Fi or BT. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. When the electronic device has a call function, the middleware 330 may further include a telephony manager for managing a voice of the electronic device or a video call function.

The middleware 330 is capable of including modules configuring various combinations of functions of the above described components. The middleware 330 is capable of providing modules specialized according to types of OSs to provide distinct functions. The middleware 330 may be adaptively configured in such a way as to remove part of the existing components or to include new components.

The API 360 may be a set of API programming functions, and may be provided with a different configuration according to an operating system. For example, in Android™ or iOS™, a single API set may be provided for each platform. In Tizen™, two or more API sets may be provided.

The applications 370 may include one or more applications for performing various functions, e.g., a home application 371, a dialer application 372, a short message service (SMS)/multi-media message service (MMS) application 373, an instant message (IM) application 374, a browser application 375, a camera application 376, an alarm application 377, an application contact 378, a voice dial application 379, an email application 380, a calendar application 381, a media player application 382, an album application 383, and a clock application 384. Furthermore, although not shown, the applications 370 may also include a health care application (e.g., an application for measuring amount of exercise, blood glucose level, etc.), and an environment information application (e.g., an application for providing atmospheric pressure, humidity, temperature, etc.).

The applications 370 are capable of including an information exchange application for supporting information exchange between an electronic device and an external device. The information exchange application is capable of including a notification relay application for relaying specific information to external devices or a device management application for managing external devices.

The applications 370 are capable of including an application (e.g., a health care application of a mobile medical device, etc.) having specified attributes of an external device. The applications 370 are capable of including applications received from an external device. The applications 370 are capable of including a preloaded application or third party applications that can be downloaded from a server. It should be understood that the components of the program module 310 may be called different names according to types of OSs.

A method of controlling fingerprint information of the disclosure in an electronic device including a memory configured to store user authenticated fingerprint information, a display, a fingerprint sensor formed in at least a partial area of the display, and a processor includes obtaining first fingerprint information corresponding to a first input (e.g., a first touch) received using the fingerprint sensor; comparing the first fingerprint information with the authenticated fingerprint information in relation to the user authentication; performing a designated function (e.g., providing a notification (e.g., one of an user interface, graphic interface, and indication) representing authentication success) related to the authentication when the authentication belongs to a first reference; and at least temporarily storing the first fingerprint information using the memory when the authentication belongs to a second reference, wherein operation of the at least temporarily storing includes operation of obtaining second fingerprint information corresponding to a second input (e.g., a second touch) in relation to user another authentication, comparing second fingerprint information with the authenticated fingerprint information in relation to the another authentication when the second input satisfies a designated reference in relation to the first input, storing the temporarily stored first fingerprint information as the user another authenticated fingerprint information when the another authentication belongs to the first reference, and performing the designated function.

When the temporarily stored first fingerprint information does not satisfy the designated reference, the method may further include deleting, by the processor, the temporarily stored first fingerprint information.

When an input time interval between the first input and the second input is within a designated time interval, the method may further include determining, by the processor, that the input time interval satisfies the designated reference.

When a proximity level of the fingerprint belongs to a designated proximity range until a time point at which the second input is detected after a time point at which the first input is detected using a touch panel, the method may further include determining, by the processor, that the proximity level of the fingerprint satisfies the designated reference.

When a movement of the electronic device belongs to a designated movement range until a time point at which the second input is detected after a time point at which the first input is detected using at least one motion sensor, the method may further include determining, by the processor, that the movement of the electronic device satisfies the designated reference.

When the another authentication does not satisfy the first reference and the second reference, the method may further include deleting, by the processor, the temporarily stored first fingerprint information.

The method may further include updating, by the processor, the authenticated fingerprint information based on at least the another fingerprint information as at least a portion of storing the temporarily stored first fingerprint information as the user another authenticated fingerprint information.

The method may further include displaying, by the processor, a user interface for storing the another fingerprint information through the display before storing the temporarily stored first fingerprint information as the user another authenticated fingerprint information.

When a comparison result of the first fingerprint information or the second fingerprint information and the authenticated fingerprint information is first similarity or more, the method may further include determining, by the processor, that the first fingerprint information or the second fingerprint information belongs to the first reference, and when the comparison result is less than the first similarity and second similarity or more, the method may further include determining, by the processor, that the first fingerprint information or the second fingerprint information belongs to the second reference.

The devices (e.g. modules or their functions) or methods described herein may be implemented by computer program instructions stored in a non-transitory computer-readable storage medium. The commands are executed by at least one processor (e.g. processor 120), the at least one processor may execute the functions corresponding to the commands. The non-transitory computer-readable storage medium may be the memory 130. At least a part of the programming module may be implemented (e.g. executed) by the processor 120. At least a part of the programming module may include modules, programs, routines, sets of instructions, and processes for executing the at least one function.

A non-transitory computer readable recording medium in which a program is recorded that performs a method of controlling fingerprint information in an electronic device the disclosure including a memory configured to store user authenticated fingerprint information, a display, a fingerprint sensor formed in at least a partial area of the display, and a processor, wherein the method includes operations of obtaining first fingerprint information corresponding to a first input (e.g., a first touch) received using the fingerprint sensor; comparing the first fingerprint information with the authenticated fingerprint information in relation to the user authentication; performing a designated function (e.g., providing a notification (e.g., one of an user interface, graphic interface, and indication) representing authentication success) related to the authentication when the authentication belongs to a first reference; and at least temporarily storing the first fingerprint information using the memory when the authentication belongs to a second reference, wherein at least temporarily storing the first fingerprint information using the memory includes obtaining second fingerprint information corresponding to a second input (e.g., a second touch) in relation to user another authentication, comparing second fingerprint information with the authenticated fingerprint information in relation to the another authentication when the second input satisfies a designated reference in relation to the first input, storing the temporarily stored first fingerprint information as the user another authenticated fingerprint information when the another authentication belongs to the first reference, and performing the designated function.

The non-transitory computer-readable storage medium includes magnetic media such as a floppy disk and a magnetic tape, optical media including a CD ROM and a DVD ROM, a magneto-optical media such as a floptical disk, and the hardware device designed for storing and executing program instructions such as ROM, RAM, and flash memory. The program instructions include the language code executable by computers using the interpreter as well as the machine language codes created by a compiler. The aforementioned hardware device can be implemented with one or more software modules for executing the instructions of the disclosure.

The module or programming module of the disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Figure 4:
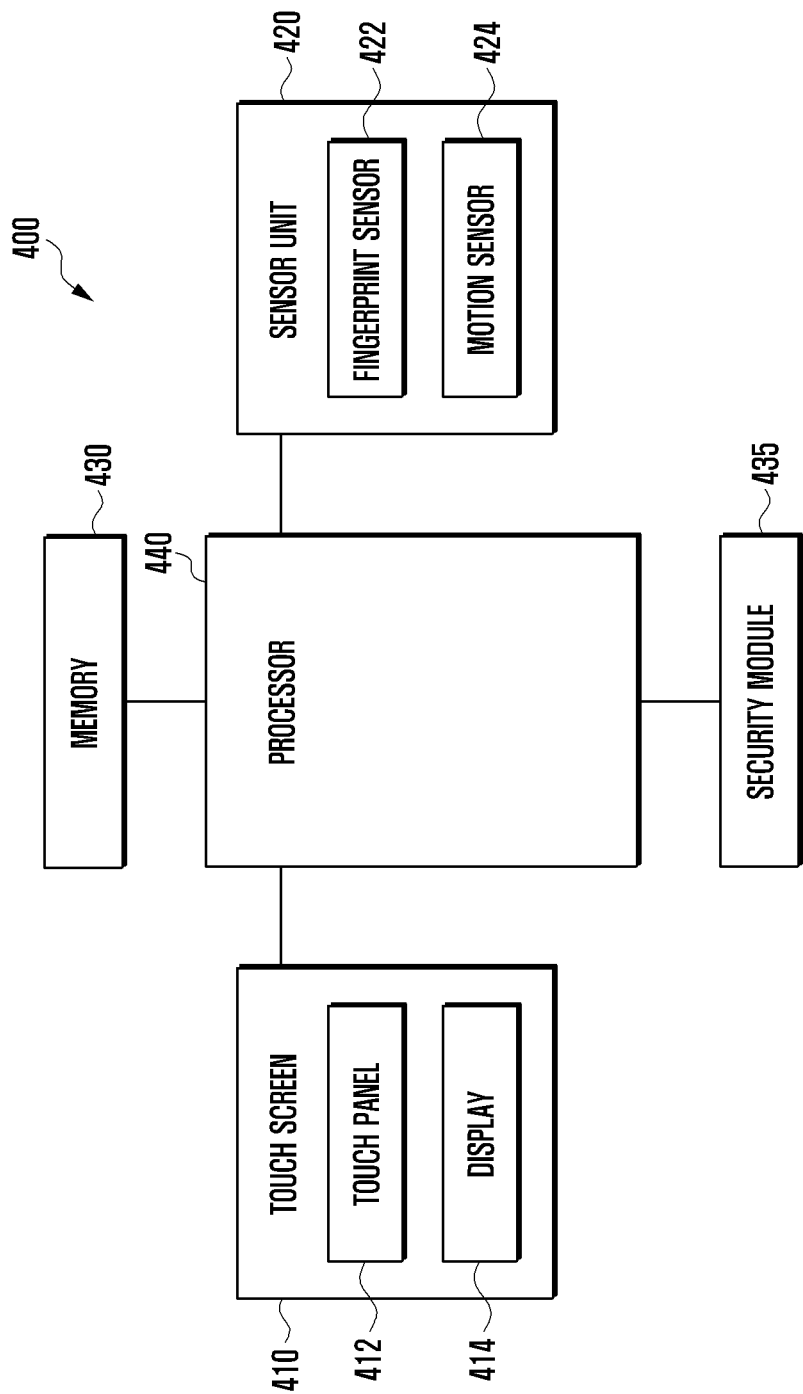
FIG. 4 is a diagram of a configuration of an electronic device, according to an embodiment.

FIG. 4 is a diagram of an electronic device, according to an embodiment of the disclosure.

An electronic device 400 of FIG. 4 may include, a portion or the entire of the electronic device 101 of FIG. 1 or the electronic device 201 of FIG. 2.

With reference to FIG. 4, the electronic device 400 may include a touch screen 410, sensor unit 420, memory 430, and processor 440.

The touch screen 410 may include a touch panel 412 and a display 414. The sensor unit 420 may include a fingerprint sensor 422 (e.g., bio sensor 240I) and a motion sensor 424 (e.g., the gyro sensor 240B or the acceleration sensor 240E.).

The touch screen 410 may display a user interface (UI) object (e.g., graphic object or indication) related to user fingerprint authentication in at least a partial area thereof. The touch screen 410 may include a fingerprint sensing area of the fingerprint sensor 422 in at least a partial area or an entire area of the touch panel 412 or the display 414. The fingerprint sensing area of the fingerprint sensor 422 may be disposed through printing or etching at a surface of cover glass provided at an upper portion of the display 414 in order to protect the display 414. The fingerprint sensing area may be disposed at an upper portion or a lower portion of the touch panel 412. The fingerprint sensing area may be disposed in a black masking area between pixels or within pixels of the touch panel 412. The touch panel 412 may be formed in a layer separate from that of the display 414 and may be disposed in an in-cell structure in the display 414.

The touch screen 410 may obtain touch input information related to fingerprint authentication of the user of the electronic device 400 through the touch panel 412 and transmit the obtained touch information to a processor 440. The touch screen 410 may display a UI object in a fingerprint sensing area including at least a portion of the fingerprint sensor 422 through the display 414 under the control of the processor 440.

The touch screen 410 may perform an input function and a display function. The touch panel 412 included in the touch screen 410 may be configured with a touch detection sensor of capacitive overlay, resistive overlay, and infrared beam or may be configured with a pressure sensor. A sensor device that can detect a contact or a pressure of an object in addition to the sensors may be configured with the touch panel 412. The touch panel 412 may detect a user touch input, generate a detection signal, and transmit the detection signal to the processor 440. The detection signal may include coordinate information, direction information, and angle information in which the user inputs a touch. When the user performs a moving action of a touch location, the touch panel 412 may generate a detection signal including coordinate information and direction information of a touch location moving path and transmit the detection signal to the processor 440. The display 414 may be formed with an LCD, an OLED, and an AMOLED and may visually provide a menu, input data, function setup information, and other various information of the electronic device 400 to the user.

The sensor unit 420 may obtain sensing data based on a user input. The sensing data may include a fingerprint, a hand pattern, a blood vessel pattern, a retina pattern, an iris pattern, an ear shape, a face shape, a DNA base sequence, a handwriting (or signature), a voice, or a walk of a user of the electronic device 400. The sensor unit 420 may include at least one of a light sensor and a pressure sensor such as a retina recognition sensor, iris recognition sensor, camera, and infrared sensor according to an authentication target of the user of the electronic device 400 in addition to the fingerprint sensor 422 and the motion sensor 424.

The fingerprint sensor 422 may obtain fingerprint information of the user of the electronic device 400. The fingerprint sensor 422 may be disposed to cover at least a partial area or an entire area of the touch screen 410. When the user inputs a touch to the touch screen 410, the fingerprint sensor 422 may obtain user fingerprint information. The electronic device 400 may include one or more fingerprint sensor 422, and the fingerprint information obtained through the fingerprint sensor 422 may be stored as image information, be compared with user fingerprint information previously stored in the memory 430, and be used for user authentication of the electronic device 400 according to a match score (e.g., matching rate or similarity) that is compared to a predetermined threshold value. The fingerprint information obtained through the fingerprint sensor 420 may be compressed, stored, and registered as user authentication information for future user authentication. The fingerprint information extracted through the fingerprint sensor 420 may be stored as one characteristic template in the memory 430.

The fingerprint sensor 422 may provide at least one fingerprint sensing method. When the user finger of the electronic device 400 touches at least a portion of a fingerprint sensing area, the fingerprint sensor 422 may obtain fingerprint information corresponding to a user fingerprint based on a changed current amount. A fingerprint sensing area of the fingerprint sensor 422 may be included in a home key, keyboard, button, icon of the electronic device 400, or a partial area or an entire area of the touch screen 410. The fingerprint sensor 422 may include a fingerprint sensing array divided into a plurality of areas.

The fingerprint sensor 422 may obtain user fingerprint information using at least one of optical, capacitive, ultrasonic, and IR methods. The optical method may capture a fingerprint image using photosensitive diodes to obtain user fingerprint information. The capacitive method may obtain fingerprint information using a principle that detects a portion (ridge) in which a fingerprint touches an electrode and that does not detect a portion (valley) in which a fingerprint does not touch an electrode. The ultrasonic method may generate ultrasonic waves through a piezoelectric element and obtain fingerprint information using a path difference of the ultrasonic waves reflected from a ridge and a valley of a fingerprint.

The motion sensor 424 may detect a movement of the electronic device 400 using at least one of the gyro sensor 240B and the acceleration sensor 240E of FIG. 2 and a geomagnetic sensor. The electronic device 400 may include at least one motion sensor 424.

The memory 430 may store and register user fingerprint information for authentication of the electronic device 400. The memory 430 may store resources of various UI objects (e.g., graphic interface or indication) related to the fingerprint sensor 422. Resources of the UI object may be loaded in a framework and be displayed in the display 414. The memory 430 may store various programs and data related to a fingerprint recognition or fingerprint touch function based on the touch panel 412 or the fingerprint sensor 422 of the electronic device 400. The memory 430 may store a processing program of a function in which the fingerprint sensor 422 obtains fingerprint information using at least one scan method and data processed according to the program. The memory 430 may previously store user fingerprint information and be used for determining whether fingerprint information to be input through the fingerprint sensor 422 corresponds with the previously stored user fingerprint information. The memory 430 may be divided into a general area and a security area to store data.

The memory 430 may perform a function of storing a program for a processing and control of the processor 440, OS, various applications, and input/output data and store a program that controls general operations of the electronic device 400. The memory 430 may store an UI provided in the electronic device 400 and various setup information requiring when processing a function in the electronic device 400.

The electronic device 400 may further include a security module 435. The security module 435 includes a storage space having a security level relatively higher than that of the memory 430 and may be a circuit that guarantees safe data storage and a protected execution environment. The security module 435 may be implemented into a separate circuit and include a separate processor. The security module 435 may exist within a detachable smart chip and an SD card or may include an eSE received within a fixed chip of the electronic device 400. The security module 435 may be driven with an OS different from an OS of the electronic device 400. The security module 435 may operate based on a Java card open platform (JCOP) OS.

The processor 440 may control a function and operation of the touch screen 410, the sensor unit 420, the memory 430, and the security module 435 within the electronic device 400. The processor 440 may execute an application stored in the memory 430. The application has a fingerprint recognition function related to financial payment, security, personal contents, and login and may include an application that can provide a UI object (e.g., indication related to fingerprint authentication) related to a fingerprint recognition function.

The processor 440 may obtain first fingerprint information corresponding to a first input (e.g., a first touch) received using the fingerprint sensor 422, compare the first fingerprint information with user authenticated fingerprint information stored in the memory 430 in relation to user authentication of the electronic device 400, and when a comparison result belongs to a first reference, the processor 440 may perform a designated function (e.g., provide a notification (e.g., graphic interface or indication) representing authentication success) related to the authentication. When a comparison result belongs to a second reference, the processor 440 may at least temporarily store the first fingerprint information using the memory 430. Operation of at least temporarily storing the first fingerprint information using the memory 430 may include obtaining second fingerprint information corresponding to a second input (e.g., a second touch) in relation to user another authentication, when the second input satisfies a designated reference in relation to the first input. The processor 440 may compare second fingerprint information with the authenticated fingerprint information in relation to the another authentication, when the another authentication belongs to the first reference. The processor 440 may be configured to store the temporarily stored first fingerprint information as the user another authenticated fingerprint information in the memory 430 and to perform the designated function.

When the temporarily stored first fingerprint information does not satisfy the designated reference, the processor 440 may be configured to delete the temporarily stored first fingerprint information from the memory 430.

When an input time interval between the first input and the second input is within a designated time interval, the processor 440 may be configured to determine whether the input time interval satisfies the designated reference.

When a proximity level until a time point at which the second input is detected after a time point at which the first input is detected using the touch panel 412 belongs to a designated proximity range, the processor 440 may be configured to determine whether the proximity level satisfies the designated reference.

When a movement of the electronic device 400 until a time point at which the second input is detected after a time point at which the first input is detected using at least one motion sensor 424 belongs to a designated movement range, the processor 440 may be configured to determine whether the movement satisfies the designated reference.

When the another authentication does not satisfy the first reference and the second reference, the processor 440 may be configured to delete the temporarily stored first fingerprint information.

The processor 440 may be configured to update the authenticated fingerprint information based on at least the another fingerprint information as at least a portion of operation of storing as the another fingerprint information.

Before storing as the another fingerprint information, the processor 440 may be configured to display a user interface (e.g., graphic interface or indication) for storing the another fingerprint information in the memory 430 through the display 414.

When a comparison result of the first fingerprint information or the second fingerprint information and the authenticated fingerprint information is first similarity or more, the processor 440 may be configured to determine whether the first fingerprint information or the second fingerprint information belongs to the first reference. When the comparison result is less than the first similarity and is second similarity or more, the processor 440 may be configured to determine whether the first fingerprint information or the second fingerprint information belongs to the second reference.

The processor 440 may perform a function of controlling general operations of the electronic device 400 and signal flow between internal constituent elements and processing data. The processor 440 may be configured with, for example, CPU, application processor, and communication processor. The processor 440 may be configured with a single core processor or a multi-core processor and may be configured with a plurality of processors.

Figure 5:
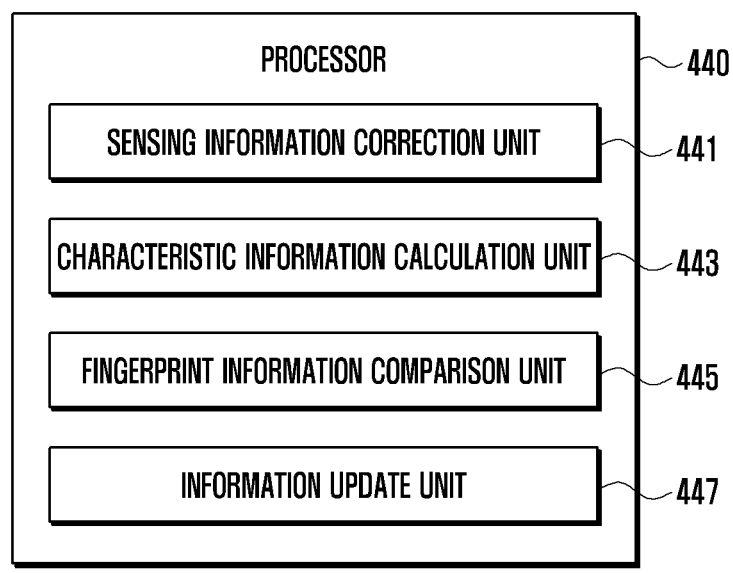
FIG. 5 is a diagram of a configuration of a processor, according to an embodiment.

FIG. 5 is a diagram of a processor of an electronic device, according to an embodiment of the disclosure.

With reference to FIG. 5, the processor 440 may include a sensing information correction unit 441, characteristic information calculation unit 443, fingerprint information comparison unit 445, and information update unit 447.

The sensing information correction unit 441 may correct fingerprint sensing data obtained through the fingerprint sensor 422. When fingerprint data (e.g., image) input through the fingerprint sensor 422 have a distorted shape or have an area of a low resolution, the sensing information correction unit 441 may correct a distorted shape or an area of a low resolution using statistical data or an image processing function. The sensing information correction unit 441 may provide corrected fingerprint data to the characteristic information calculation unit 443.

The characteristic information calculation unit 443 may calculate characteristic information of fingerprint data based on the corrected fingerprint data. The characteristic information of fingerprint data may be minutiae representing at least one characteristic point. The minutiae may include at least one of a bifurcation point, end point, core point, and delta. Further, the minutiae may include a characteristic point representing a direction or a shape of ridges and valleys between the ridges. The characteristic information may be calculated in a form of a characteristic information template, which is an information format of a predetermined format (or frame) in order to determine a level matched to fingerprint information stored for authentication in the memory 430. When fingerprint data input through the fingerprint sensor 422 are obtained to perform authentication of the user of the electronic device 400, the characteristic information calculation unit 443 may provide a characteristic information template including characteristic information of fingerprint data to the fingerprint information comparison unit 445. When the obtained fingerprint data are obtained to register a user fingerprint, the characteristic information calculation unit 443 may store a characteristic information template including characteristic information of fingerprint data in the memory 430.

The fingerprint information comparison unit 445 may receive a characteristic information template from the characteristic information calculation unit 443 to determine whether the characteristic information template matches to a characteristic information template previously stored and registered in the memory 430. The fingerprint information comparison unit 445 may derive a match score (e.g., a matching rate or similarity) representing match information between characteristic information templates as a match result. The match score may be calculated based on a value representing the number or a corresponding level of matched characteristic points among characteristic points included in each of a characteristic information template and a previously registered characteristic information template. The match score may be calculated according to statistical data or a probability function in consideration of similarity of a distance, direction, or disposition form between characteristic points included in each characteristic information template from a reference point.

The fingerprint information comparison unit 445 may compare a calculated match score value with a specific threshold value (e.g., a match score threshold) to determine whether authentication of the user of the electronic device 400 is succeeded. For example, when a match score is greater than or equal to a predetermined threshold value, the fingerprint information comparison unit 445 may confirm authentication success. The specific threshold value may be preset by a production company of the electronic device 400, an application installed in the electronic device 400, or a provider of an operating system. The specific threshold value may be designated according to a security level set through a user interface. The fingerprint information comparison unit 445 may compare a match score with a specific threshold value to store fingerprint information in the memory 430 when the authentication fails.

When authentication fails and satisfies a designated reference), the information update unit 447 may update registration information related to user fingerprint stored in the memory 430.

Figure 6:
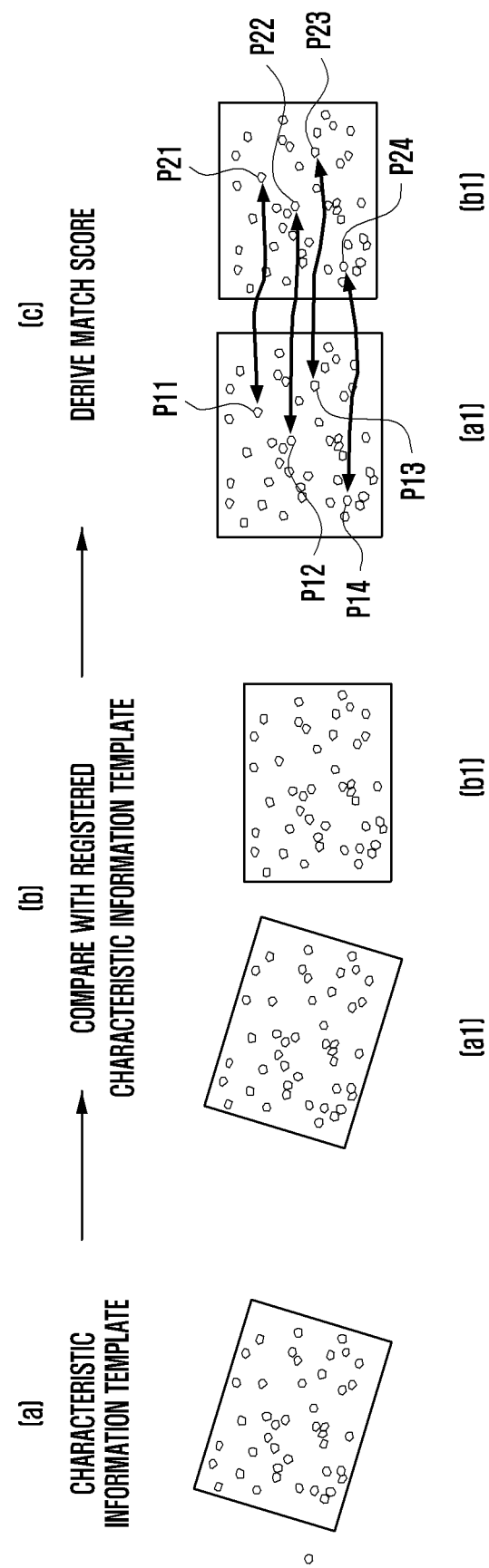
FIG. 6 is a diagram for comparing fingerprint information in order to perform fingerprint authentication in an electronic device, according to an embodiment.

FIG. 6 is a diagram of comparing fingerprint information in order to perform fingerprint authentication in an electronic device, according to an embodiment of the disclosure.

With reference to FIG. 6, the processor 440 may compare fingerprint information input for authentication of a user of the electronic device 400 with fingerprint information previously stored and registered in the memory 430.

At (a) in FIG. 6, the processor 440 may extract a characteristic information template from user fingerprint information input for authentication of a user of the electronic device 400.

At (b) in FIG. 6, the processor 440 may compare the input fingerprint information related characteristic information template with a plurality of fingerprint information of a user previously stored and registered in the memory 430. For example, (a1) illustrates a characteristic information template of input fingerprint information, and (b1) illustrates a characteristic information template of fingerprint information previously stored and registered in the memory 430.

At (c) in FIG. 6, the processor 440 may determine whether points P11, P12, P13, and P14 of the characteristic information template (a1) of fingerprint information input for authentication of the user of the electronic device 400 match to points P21, P22, P23, and P24 of the characteristic information template (b1) of fingerprint information previously stored and registered in the memory 430 to derive a match score. If a match score is greater than or equal to a specific threshold value, the processor 440 may determine authentication success, and if a match score is less than a specific threshold value, the processor 440 may determine authentication failure.

Figure 7:
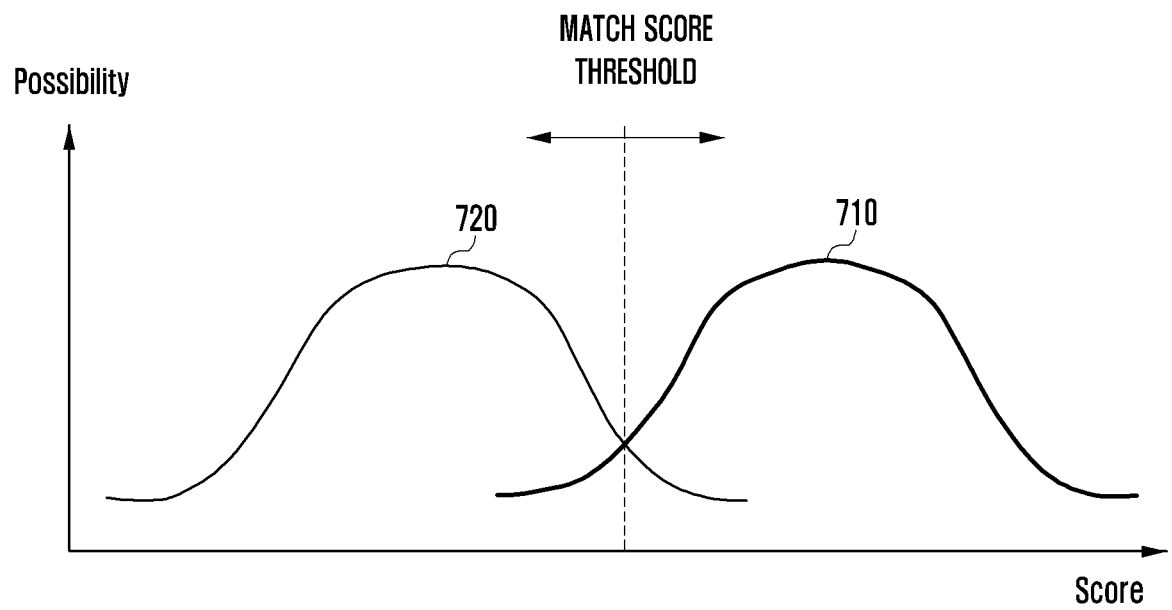
FIG. 7 is a graph of an acceptance rate and a rejection rate of fingerprint authentication in an electronic device, according to an embodiment.

FIG. 7 is a graph of an acceptance rate and a rejection rate of fingerprint authentication in an electronic device, according to an embodiment of the disclosure.

With reference to FIG. 7, an X-axis represents a match score of fingerprint information input for authentication of the user of the electronic device 400 and fingerprint information previously stored and registered in the memory 430, and a Y-axis represents a match possibility of fingerprint information input for authentication of the user of the electronic device 400 and fingerprint information previously stored and registered in the memory 430.

When a match score of fingerprint information input through the fingerprint sensor 422 and fingerprint information previously stored and registered in the memory 430 is greater than or equal to a threshold value, the processor 440 may determine authentication success, and when a match score is less than a threshold value, the processor 440 may determine authentication failure.

A first curve 710 shown at the right side of FIG. 7 is a graph representing a probability density of an acceptance rate of fingerprint authentication of the fingerprint sensor 422, and a second curve 720 shown at the left side of FIG. 7 is a graph representing a probability density of a rejection rate of fingerprint authentication of the fingerprint sensor 422. When a threshold value of a match score is located between the first curve 710 and the second curve 720, integral calculus of a probability value of the first curve 710 may be an acceptance rate at a segment from a match score corresponding to a threshold value to a match score corresponding to the end of the first curve 710 (e.g., an increasing direction of a match score). Integral calculus of a probability value of the second curve 720 may be a rejection rate at a segment from a match score corresponding to a threshold value to a match score corresponding to the end of the second curve 720 (e.g., a reducing direction of a match score).

A threshold value of the match score may be set based on a point at which the first curve 710 and the second curve 720 meet. When a threshold value of a match score is lowered, an acceptance rate increases; thus, a different user may be erroneously or incorrectly determined as the same user, whereby a security problem may occur. When a threshold value of a match score is increased, a rejection rate is increased; thus, a probability increases in which the same user of the electronic device 400 may be determined to a different user; thus, user inconvenience may increase. Accordingly, a reference of a threshold value of a match score may be set in consideration of both an acceptance rate and a rejection rate.

Figure 8:
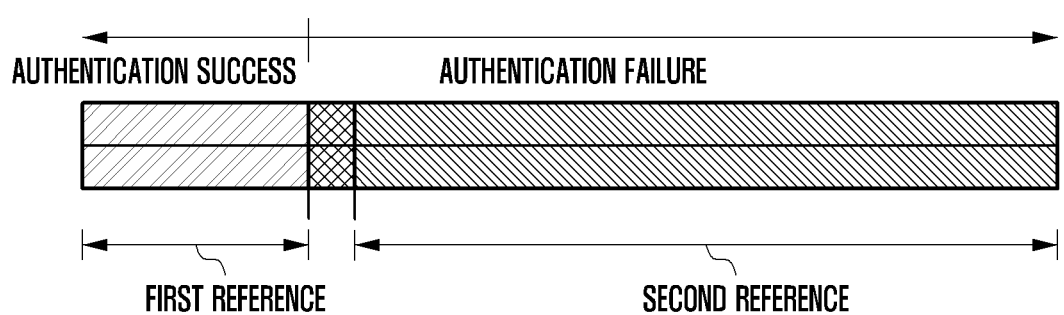
FIG. 8 is a diagram of a reference setup of a threshold of a match score in fingerprint authentication of an electronic device, according to an embodiment.

FIG. 8 is a diagram of a reference setup of a threshold value of a match score in fingerprint authentication of an electronic device, according to an embodiment of the disclosure.

With reference to FIG. 8, the processor 440 may set a reference of a match score (e.g., matching rate) for performing fingerprint authentication of a user of the electronic device 400 through the fingerprint sensor 422 to a first reference and a second reference and store the references in the memory 430.

When a match score of user fingerprint information input through the fingerprint sensor 422 and fingerprint information previously stored and registered in the memory 430 belongs to a first reference, the processor 440 may determine the fingerprint information to be the same user fingerprint information to process the fingerprint information to authentication success.

When a match score of user fingerprint information input through the fingerprint sensor 422 and fingerprint information previously stored and registered in the memory 430 does not belong to a second reference, the processor 440 may determine the user fingerprint information to different user fingerprint information instead of the same user fingerprint information to process the user fingerprint information to authentication failure. For example, in the first reference, a match score of user fingerprint information input through the fingerprint sensor 422 and fingerprint information previously stored and registered in the memory 430 may be 80%-100%. In the second reference, a match score of user fingerprint information input through the fingerprint sensor 422 and fingerprint information previously stored and registered in the memory 430 may be 0%-75%.

The processor 440 may compare user fingerprint information (e.g., first fingerprint information) input (e.g., first input) through the fingerprint sensor 422 with fingerprint information previously stored and registered in the memory 430, and when a match score is less than a first reference (e.g., a matching rate of 79%) and is a second reference or more (e.g., a matching rate of 75%), the processor 440 may process the user fingerprint information to authentication failure. The processor 440 may temporarily store user fingerprint information (e.g., first fingerprint information) input (e.g., first input) through the fingerprint sensor 422 at a general area (e.g., temporary storage area) different from a security area (e.g., a storage area of registered fingerprint information) of the memory 430.

When another fingerprint information (e.g., second fingerprint information) is input (e.g., second input) by the user, the processor 440 may compare the another fingerprint information (e.g., second fingerprint information) with fingerprint information stored and registered in the memory 430, and when a match score satisfies a first reference or more (e.g., a matching rate of 80% or more), the processor 440 may process the another fingerprint information to authentication success and store and register fingerprint information temporarily stored in the memory 430 as user fingerprint information of the electronic device 400 in the memory 430.

Only when previously input (e.g., first input) user fingerprint information (e.g., first fingerprint information) and re-input (e.g., second input) fingerprint information (e.g., second fingerprint information) satisfies input continuity based on user input pattern information through the fingerprint sensor 422, the processor 440 may temporarily store the input (e.g., first input) fingerprint information in the memory 430. When previously input (e.g., first input) user fingerprint information (e.g., first fingerprint information) and re-input (e.g., second input) fingerprint information (e.g., second fingerprint information) does not satisfy input continuity based on user input pattern information through the fingerprint sensor 422, the processor 440 may delete fingerprint information temporarily stored in the memory 430. The input continuity may include input continuity of a user touch to the fingerprint sensor 422 or input continuity of a touch time to the fingerprint sensor 422.

Figure 9:
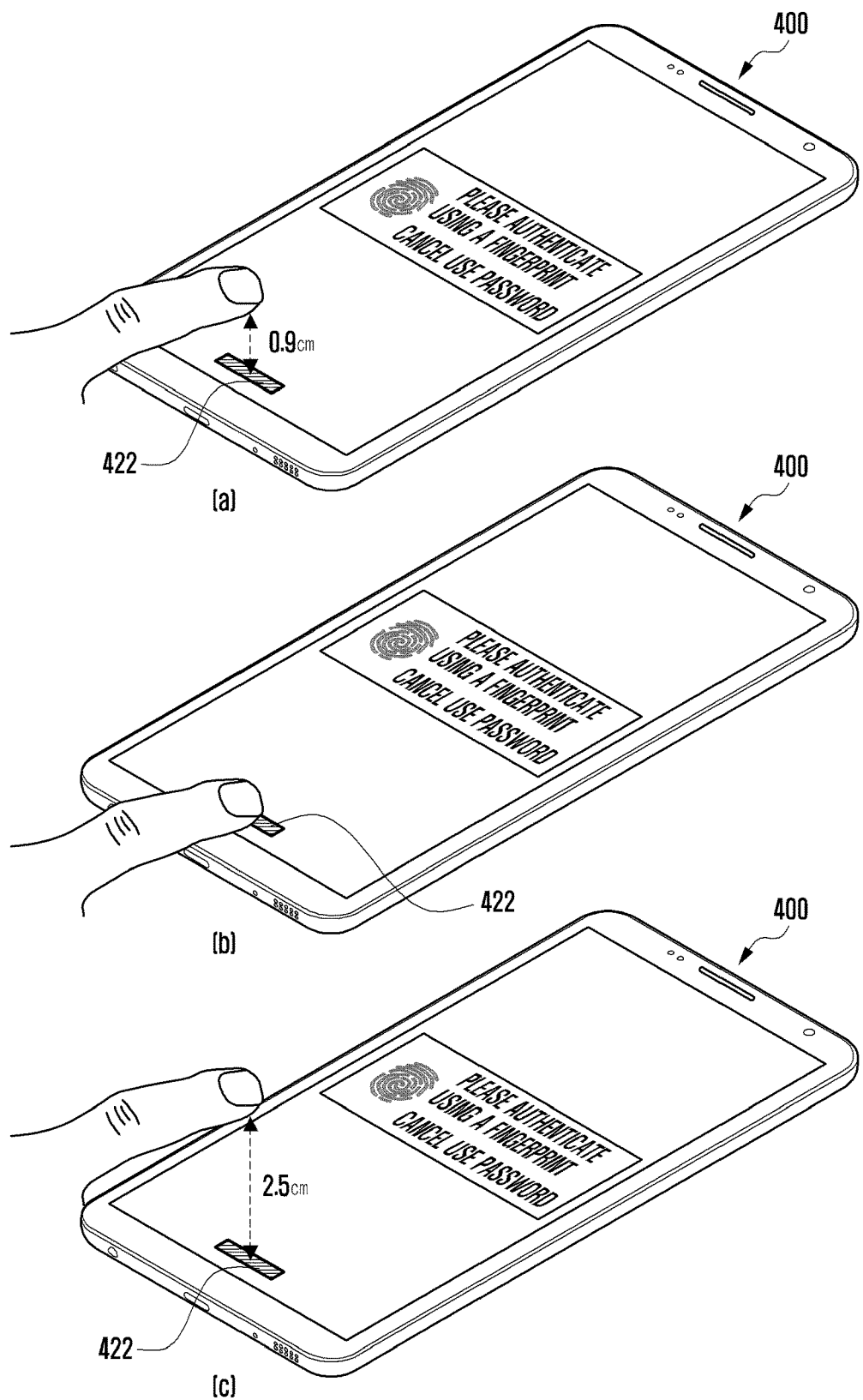
FIG. 9 is a diagram of input continuity of a fingerprint input in an electronic device, according to an embodiment.

FIG. 9 is a diagram of an input continuity of a fingerprint input in an electronic device, according to an embodiment of the disclosure.

When the user of the electronic device 400 inputs a fingerprint through the fingerprint sensor 422, in order to determine input continuity, the processor 440 may determine input continuity based on a user touch input to the fingerprint sensor 422. For example, when a user fingerprint input to the fingerprint sensor 422 continuously occurs, the fingerprint sensor 422 may detect a hovering input corresponding to the user finger touch input. When the user does not directly touch the fingerprint sensor 422 through the finger but when the user finger approaches the fingerprint sensor 422, the hovering input may include a proximity touch that detects fingerprint information.

The fingerprint sensor 422 may detect hovering of a user finger for a fingerprint input, and when a finger touch input occurs in a fingerprint sensing area of the fingerprint sensor 422, and when fingerprint sensing is complete, the processor 440 may compare sensed fingerprint information with fingerprint information previously stored in the memory 430 to determine similarity (e.g., a matching rate) of fingerprint information.

Because fingerprint similarity is less than a predetermined reference (e.g., a first reference) as a comparison result of fingerprint information, when authentication fails, the user may release and retouch the finger from the fingerprint sensor 422. The fingerprint sensor 422 may detect hovering of the user finger, and the processor 440 may determine continuity of a user input to the fingerprint sensor 422.

As shown in (a) in FIG. 9, when a distance between a user finger of the electronic device 400 and the fingerprint sensor 422 is within approximately 1 cm (e.g., 0.9 cm), the processor 440 may determine a hovering detection distance to a detection distance (e.g., within 1 cm) satisfying input continuity. As shown in (c) in FIG. 9, when a distance between a user finger of the electronic device 400 and the fingerprint sensor 422 exceeds (e.g., 2.5 cm) 1 cm, the processor 440 may determine that the distance to a detection distance (e.g., exceeds 1 cm) does not satisfy input continuity.

At (b) in FIG. 9, after a touch input of the fingerprint sensor 422 for fingerprint recognition, as authentication of the user of the electronic device 400 fails, when a hovering input is continuously maintained between touch inputs of two times of touch release and retouch, the processor 440 may determine that the touch inputs of two times for fingerprint sensing are performed by the same user to determine whether input continuity. When a hovering input is not detected between two touch inputs, the processor 440 may determine that a first input for fingerprint sensing and a second input are not an input of the same user.

The processor 440 may determine whether user fingerprint information is updated according to a movement of the electronic device 400 using the motion sensor 424. For example, when the motion sensor 424 (e.g., the gyro sensor 240B or the acceleration sensor 240E of FIG. 2) detects a predetermined movement or more between a first input for fingerprint sensing and a second input, the processor 440 may determine that the first input and the second input are not an input of the same user to delete temporarily stored fingerprint information.

Figure 10:
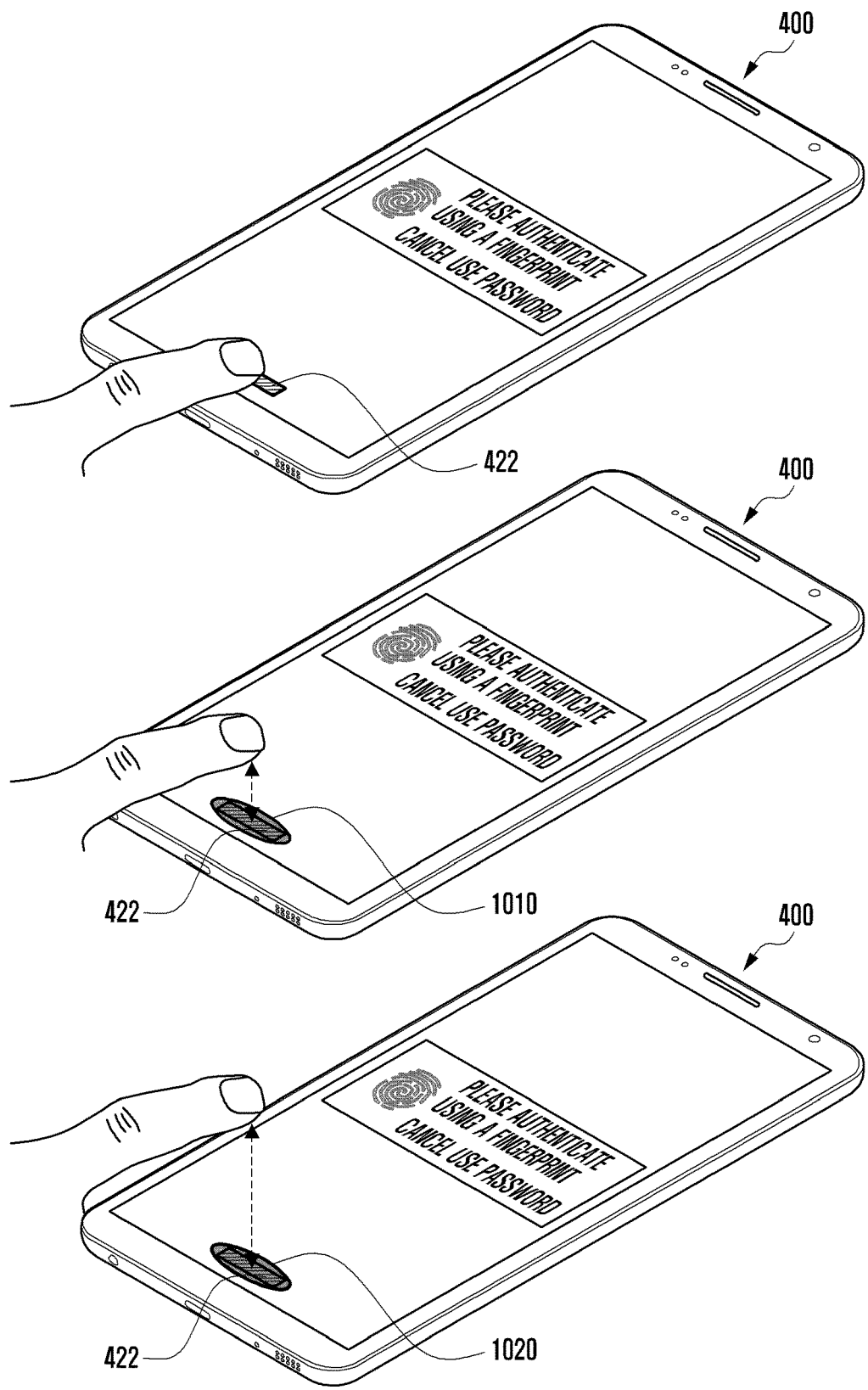
FIG. 10 is a diagram of a method for providing different indications in a fingerprint sensing area according to a hovering location of a fingerprint sensor of an electronic device, according to an embodiment.

FIG. 10 is a diagram of a method for providing another indication to a fingerprint sensing area according to a hovering location of a fingerprint sensor of an electronic device, according to an embodiment of the disclosure.

The processor 440 may provide another user interface (e.g., a first indication 1010) (e.g., green at (b)) or a second indication 1020 (e.g., red at (c)) to a fingerprint sensing area of the fingerprint sensor 422 (at (a)) according to a hovering location of a finger released after a touch of the fingerprint sensor 422.

The processor 440 may calculate a distance between a finger and the fingerprint sensor 422 according to hovering strength of a finger released after a touch of the fingerprint sensor 422. For example, the processor 440 may differently provide a color, shape, or intensity of a vibration of the first indication 1010 or the second indication 1020 according to a hovering location or strength.

Figure 11:
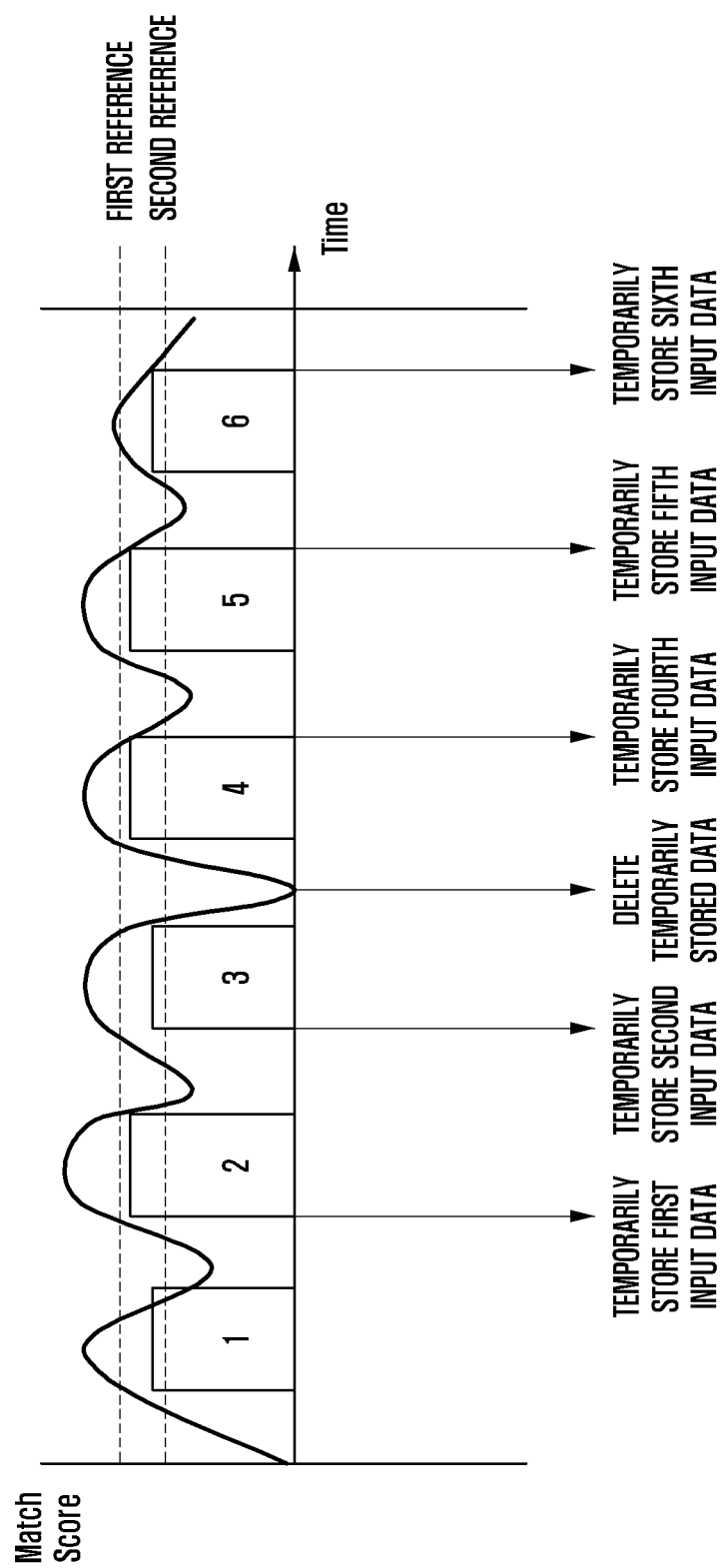
FIG. 11 is a diagram of an example according to a first reference and a second reference of a match score for fingerprint authentication of an electronic device, according to an embodiment.

FIG. 11 is a diagram of an example according to a first reference and a second reference of a match score for fingerprint authentication of an electronic device, according to an embodiment of the disclosure.

With reference to FIG. 11, when a first fingerprint input occurs in the fingerprint sensor 422, the processor 440 may compare the first fingerprint input with fingerprint information registered for authentication in the memory 430, and when a match score exists between a first reference and a second reference and when hovering detection is maintained until a second fingerprint input occurs, the processor 440 may temporarily store fingerprint information through the first fingerprint input in the memory 430. Fingerprint information through the first fingerprint input may be stored in a general area (e.g., a temporary storage area) of the memory 430.

When a segment in which hovering detection is not maintained occurs between a third fingerprint input and a fourth fingerprint input to the fingerprint sensor 422, the processor 440 may delete first fingerprint input information and second fingerprint input information temporarily stored in the memory 430. Thereafter, when a match score exists between a first reference and a second reference, the processor 440 may temporarily store fourth fingerprint input information, fifth fingerprint input information, and sixth fingerprint input information satisfying input continuity (e.g., hovering detection) in the memory 430. While input continuity (e.g., hovering detection) is maintained, when a fingerprint input satisfying a matching score of the first reference is detected, the processor 440 may store and register the fourth, fifth, and sixth fingerprint input information temporarily stored in the memory 430 as fingerprint information of the user of the electronic device 400 in the memory 430.

Figure 12:
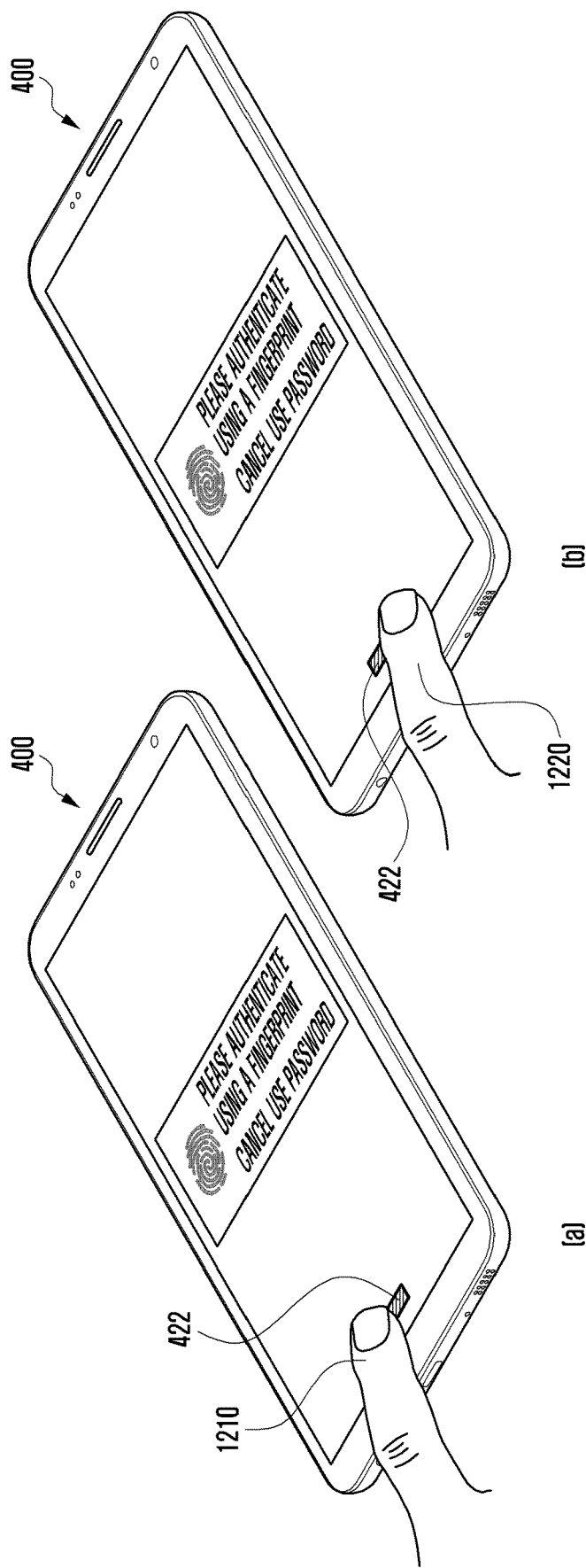
FIG. 12 is a diagram of a method in which fingerprint obtainment continuously occurs after a touch is input to a fingerprint sensor of an electronic device, according to an embodiment.

FIG. 12 is a diagram of a method in which fingerprint obtainment continuously occurs after a touch is input to a fingerprint sensor of an electronic device, according to an embodiment of the disclosure.

After a user finger touches the fingerprint sensor 422 (at (a)), when fingerprint obtainment continuously occurs in a state in which the touch is not released, the processor 440 may determine that input continuity of fingerprint information is satisfied.

After a user touch event to the fingerprint sensor 422 occurs, when fingerprint authentication of the user of the electronic device 400 fails, the processor 440 may determine whether the user finger touch to the fingerprint sensor 422 is moved from a first location 1210 to a second location 1220 (at (b)) and re-obtain user fingerprint information at a time point at which a touch movement is complete from the first location 1210 to the second location 1220. When user fingerprint information is re-obtained in a state in which a user touch to the fingerprint sensor 422 is not released, the processor 440 may determine that input continuity is satisfied.

Figure 13:
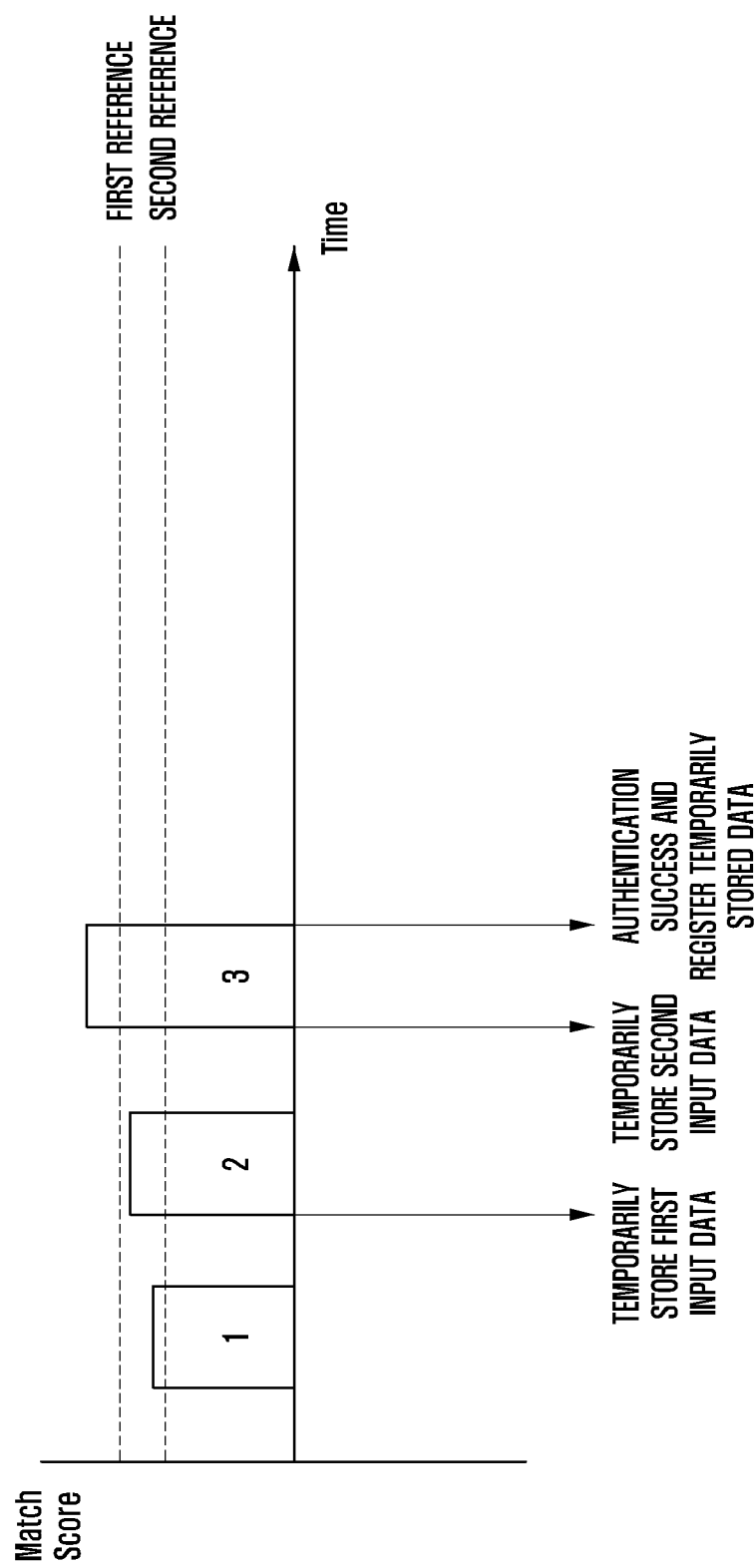
FIG. 13 is a diagram of a first reference and a second reference of a match score for fingerprint authentication of an electronic device, according to an embodiment.

FIG. 13 is a diagram of a first reference and a second reference of a match score for fingerprint authentication of an electronic device, according to an embodiment of the disclosure.

With reference to FIG. 13, the processor 440 may temporarily store fingerprint information through a first fingerprint input and a second fingerprint input in the memory 430 according to a match score (e.g., a matching rate) of similarity of fingerprint information input through the fingerprint sensor 422 and fingerprint information previously stored and registered in the memory 430. When temporarily stored first fingerprint input information and second fingerprint input information succeeds in user authentication, the processor 440 may store fingerprint information through the first fingerprint input and the second fingerprint input as registration data for authentication in the memory 430. In order to determine continuity of a fingerprint input to the fingerprint sensor 422, the processor 440 may determine continuity based on a time interval of a continued fingerprint input.

The processor 440 may compare first fingerprint input information with fingerprint information previously stored and registered in the memory 430, and when a match score exists between a first reference and a second reference and when a second fingerprint input occurs within a predetermined reference time, the processor 440 may temporarily store fingerprint information through the first fingerprint input in the memory 430. Thereafter, when a third fingerprint input occurs within a predetermined reference time (e.g., about 2 seconds) and when a match score satisfies a first reference, the processor 440 may perform a fingerprint authentication success processing and store first fingerprint input information and second fingerprint input information temporarily stored in the memory 430 as registration data for comparing user fingerprint authentication in the memory 430.

Figure 14:
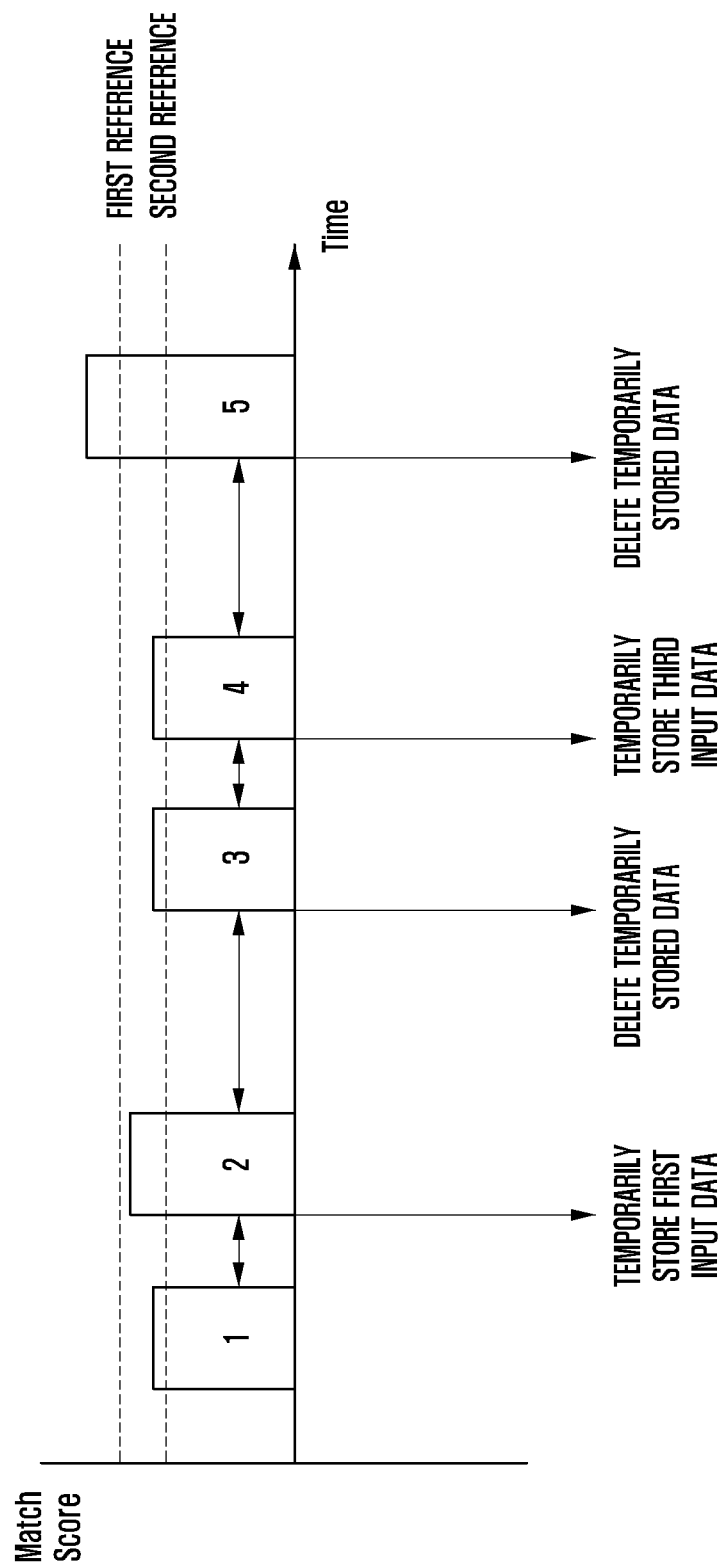
FIG. 14 is a diagram of a first reference and a second reference of a match score for fingerprint authentication of an electronic device, according to an embodiment.

FIG. 14 is a diagram of a first reference and a second reference of a match score for fingerprint authentication of an electronic device, according to an embodiment of the disclosure.

With reference to FIG. 14, when a time interval between a first fingerprint input and a second fingerprint input does not satisfy a predetermined reference time (e.g., about 2 seconds), the processor 440 may delete fingerprint information temporarily stored in the memory 430.

When a match score of first fingerprint input information through the fingerprint sensor 422 and fingerprint information previously stored and registered in the memory 430 exists between a first reference and a second reference, when a second fingerprint input occurs within a predetermined reference time, and when the match score exists between the first reference and the second reference, the processor 440 may temporarily store first fingerprint input information in the memory 430. Thereafter, when a third fingerprint input occurs within a time that does not satisfy a predetermined reference time, the processor 440 may delete first fingerprint input information temporarily stored in the memory 430. When a fourth fingerprint input occurs within a predetermined reference time, the processor 440 may temporarily store information of the third fingerprint input in the memory 430. Thereafter, when a fifth fingerprint input is continuously detected, if a match score of information of the fifth fingerprint input satisfies a first reference, the processor 440 may perform a fingerprint authentication success processing, and when a time interval between the fourth fingerprint input and the fifth fingerprint input does not satisfy a predetermined reference time, the processor 440 may delete the third fingerprint input information temporarily stored in the memory 430.

Figure 15:
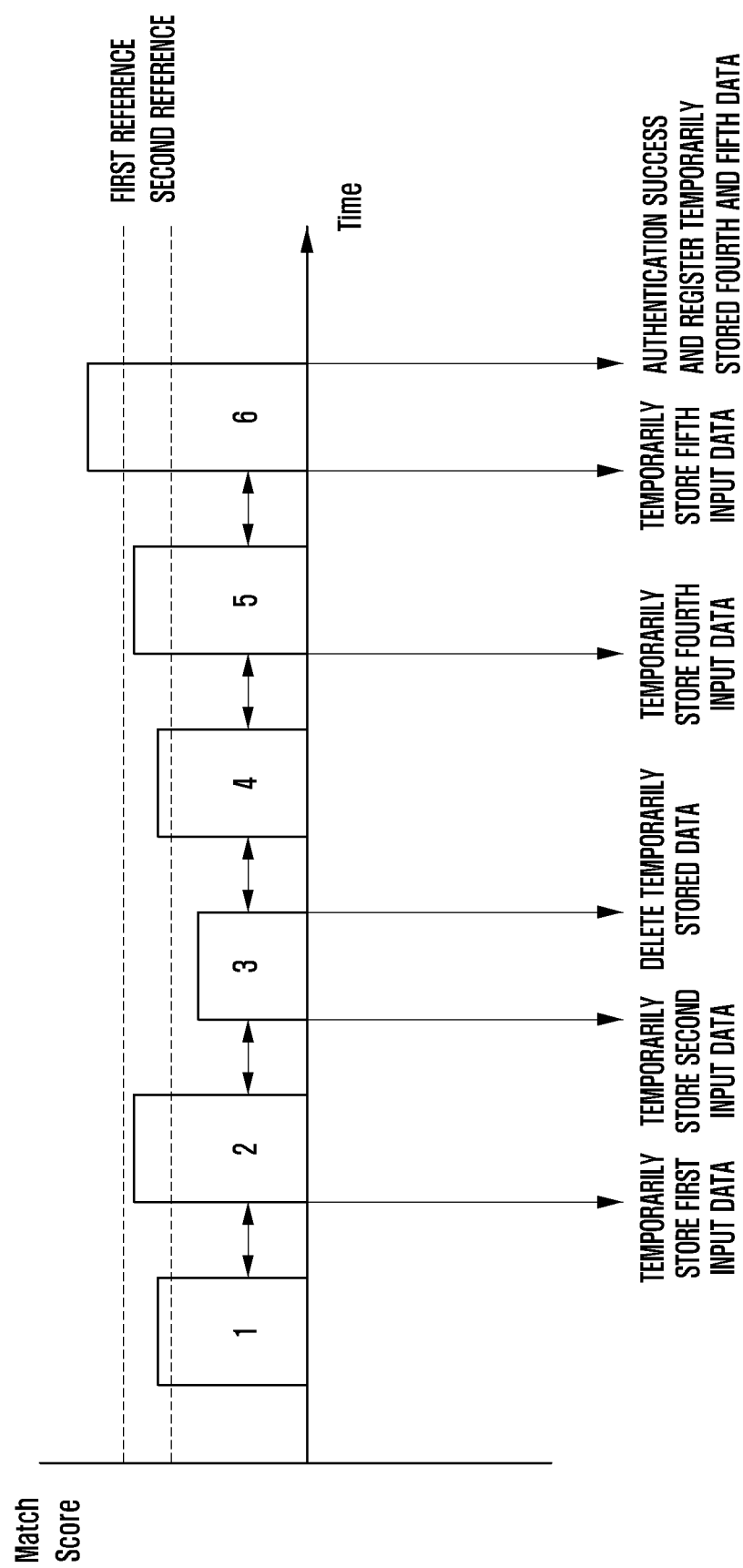
FIG. 15 is a diagram of a first reference and a second reference of a match score for fingerprint authentication of an electronic device, according to an embodiment.

FIG. 15 is a diagram of a first reference and a second reference of a match score for fingerprint authentication of an electronic device, according to an embodiment of the disclosure.

With reference to FIG. 15, in a continuous fingerprint input process such as a first fingerprint input to a sixth fingerprint input to the fingerprint sensor 422, when a fingerprint input (e.g., a third fingerprint input) that does not satisfy a second reference occurs, the processor 440 may delete fingerprint information of the third fingerprint input temporarily stored in the memory 430.

When a match score of first fingerprint input information through the fingerprint sensor 422 and fingerprint information previously stored and registered in the memory 430 satisfies between a first reference and a second reference and when a second fingerprint input occurs within a predetermined reference time, the processor 440 may temporarily store the first fingerprint input information in the memory 430. When a match score of second fingerprint input information through the fingerprint sensor 422 and fingerprint information previously stored and registered in the memory 430 exists between the first reference and the second reference and when a third fingerprint input occurs within a predetermined reference time, the processor 440 may temporarily store the second fingerprint input information in the memory 430.

Thereafter, when a third fingerprint input occurs within a predetermined reference time and when a match score of the third fingerprint input information does not satisfy the second reference, the processor 440 may delete the first fingerprint input information and the second fingerprint input information temporarily stored in the memory 430. When a fourth fingerprint input and a fifth fingerprint input satisfying a match score between the first reference and the second reference occur within a predetermined reference time, the processor 440 may temporarily store fourth fingerprint input information and fifth fingerprint input information in the memory 430.

Thereafter, when a sixth fingerprint input satisfying the first reference occurs, the processor 440 may perform a fingerprint authentication success processing of the user and store the fourth fingerprint input information and the fifth fingerprint input information temporarily stored in the memory 430 as registration data for user authentication in the memory 430.

When a match score satisfies the first reference and the second reference and when a fingerprint input having the satisfied reference occurs the designated number or more, the processor 440 may update user fingerprint information stored in the memory 430. When first fingerprint input information, second fingerprint input information, and third fingerprint input information to the fingerprint sensor 422 is a fingerprint satisfying the first reference and the second reference, the processor 440 may determine similarity (e.g., a matching rate) between the first fingerprint input information, the second fingerprint input information, and the third fingerprint input information and fingerprint information previously stored and registered in the memory 430 and store the first fingerprint input information, the second fingerprint input information, and the third fingerprint input information as fingerprint registration data for comparing user fingerprint authentication in the memory 430.

Figure 16:
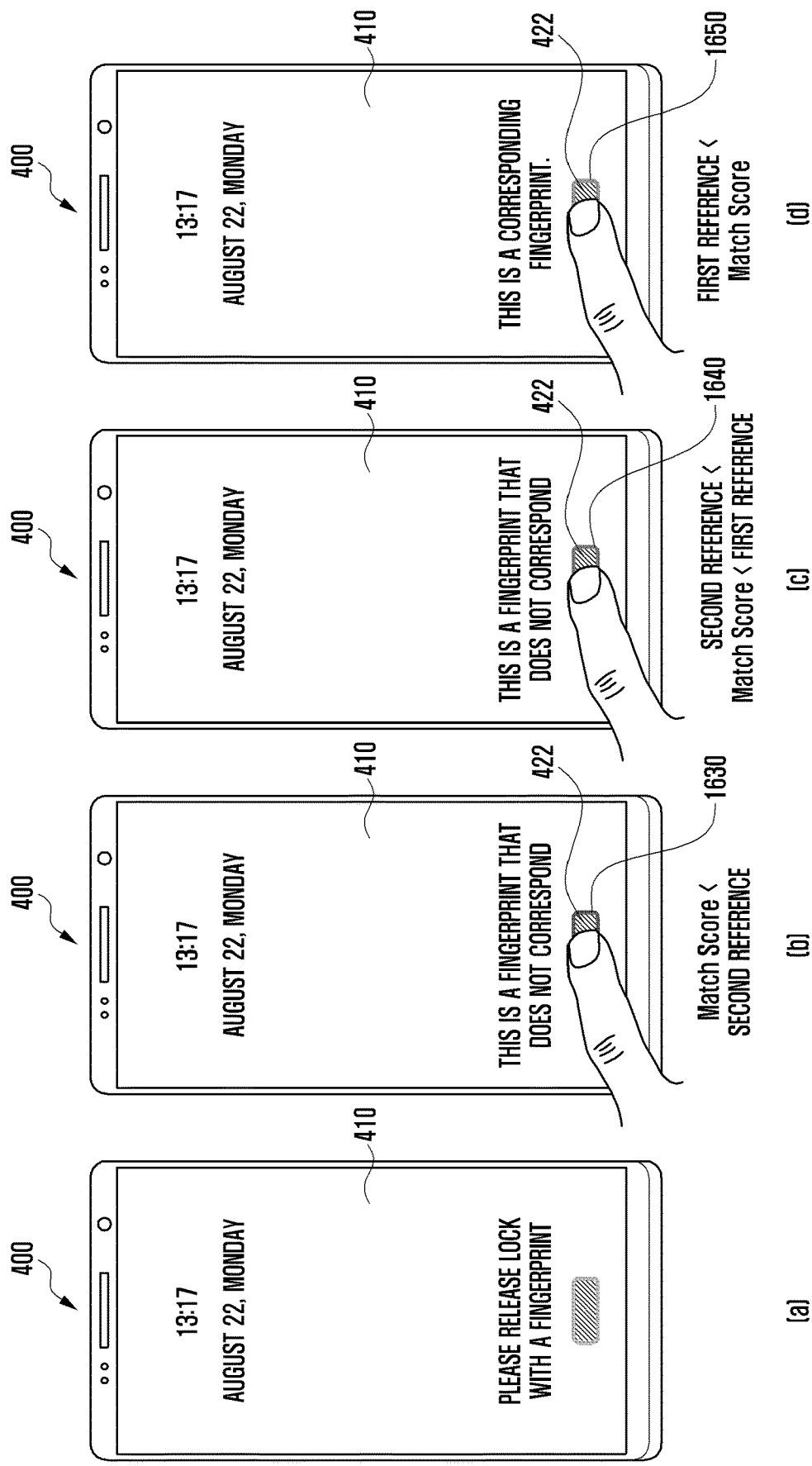
FIGS. 16 and 17 are diagrams of a first reference and a second reference of an electronic device, according to an embodiment.
Figure 17:
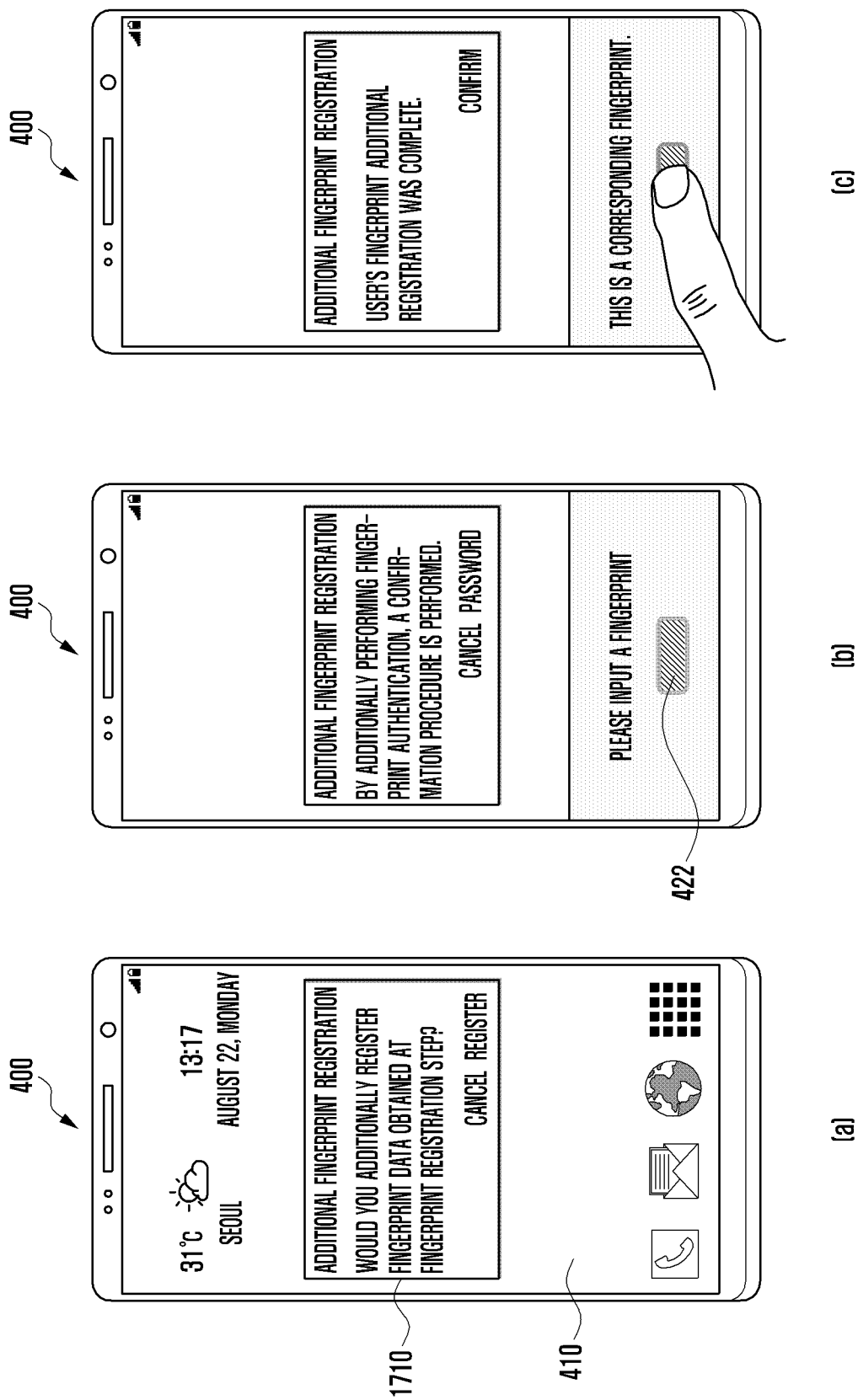

FIGS. 16 and 17 are diagrams of a first reference and a second reference of an electronic device, according to an embodiment of the disclosure.

With reference to FIG. 16 at (a), the electronic device 400 a user fingerprint input in a screen lock state may be displayed.

With reference to FIG. 16 (*b*), when a user first fingerprint input is detected through the fingerprint sensor 422, the processor 440 may obtain fingerprint information corresponding to the detected first fingerprint input. The processor 440 may compare the obtained first fingerprint input information with fingerprint information previously stored and registered in the memory 430 to determine a match score (e.g., a matching rate).

When the determined match score is less than a second reference (e.g., a matching rate of 75%), the first fingerprint input information is not user fingerprint information registered in the memory 430; thus, the processor 440 may not release lock of the electronic device 400 and not store the first fingerprint input information in the memory 430. The processor 440 may display feedback (e.g., this is a fingerprint that does not correspond/match) representing that the first fingerprint input information does not correspond with user fingerprint information registered in the memory 430 on the touch screen 410 and provide a third indication 1630 (e.g., red) that may be distinguished by the user in a fingerprint sensing area of the fingerprint sensor 422.

With reference to FIG. 16 at (c), when a user second fingerprint input is detected through the fingerprint sensor 422, the processor 440 may obtain fingerprint information corresponding to the detected second fingerprint input. The processor 440 may compare the obtained second fingerprint input information with fingerprint information previously stored and registered in the memory 430 to determine a match score (e.g., a matching rate).

When the determined match score is less than a first reference (e.g., a matching rate of 80%) and exceeds a second reference (e.g., a matching rate of 75%), it is insufficient to determine second fingerprint input information to user fingerprint information registered in the memory 430, but the processor 440 may determine the second fingerprint input information to user fingerprint information having a relatively high match score and may not release lock of the electronic device 400, and the processor 440 may temporarily store the second fingerprint input information in the memory 430. The processor 440 may recognize the second fingerprint input information as user fingerprint information corresponding to user fingerprint information registered in the memory 430 by a predetermined probability (or more) and provide a fourth indication 1640 (e.g., yellow) that provides a guide in which the user may change a fingerprint input direction or a posture.

With reference to FIG. 16 at (d), when a third fingerprint input of the user is detected through the fingerprint sensor 422, the processor 440 may obtain fingerprint information corresponding to the detected third fingerprint input. The processor 440 may compare the obtained third fingerprint input information with fingerprint information previously stored and registered in the memory 430 to determine a match score (e.g., a matching rate). When the determined match score is a first reference (e.g., a matching rate of 80%) or more, the processor 440 may determine the third fingerprint input information to user fingerprint information registered in the memory 430 to release lock of the electronic device 400. The processor 440 may control to display feedback (e.g., this is a corresponding fingerprint) representing that the third fingerprint input information corresponds with user fingerprint information registered in the memory 430 on the touch screen 410 and provide a fifth indication 1650 (e.g., green) that may be distinguished by the user in a fingerprint sensing area of the fingerprint sensor 422. The processor 440 may provide a user interface (e.g., a home screen) according to lock release of the electronic device 400 on the touch screen 410.

With reference to FIG. 17 at (a), after authentication failure at a previous fingerprint authentication step while entering a home screen, the processor 440 of the electronic device 400 may provide a sixth indication 1710 that requests to additionally register second fingerprint input information temporarily stored in the memory 430 as registration data for user authentication on the touch screen 410. When the processor 440 receives a signal (e.g., cancellation input) wanting to register the second fingerprint input information as registration data from the user through the sixth indication 1710, the processor 440 may delete the second fingerprint input information temporarily stored in the memory 430. When the processor 440 receives a signal (e.g., registration input) wanting to register second fingerprint input information as registration data from the user through the sixth indication 1710, the processor 440 may additionally register the second fingerprint input information temporarily stored in the memory 430 as registration data for user authentication.

With reference to FIG. 17 at (b) and (c), when the processor 440 additionally registers the second fingerprint input information as user registration fingerprint data, the processor 440 may additionally perform user fingerprint authentication through the fingerprint sensor 422, additionally determine whether the second fingerprint input information to additionally register is a registration request from the user of the electronic device 400, and complete registration of the second fingerprint input information.

Figure 18:
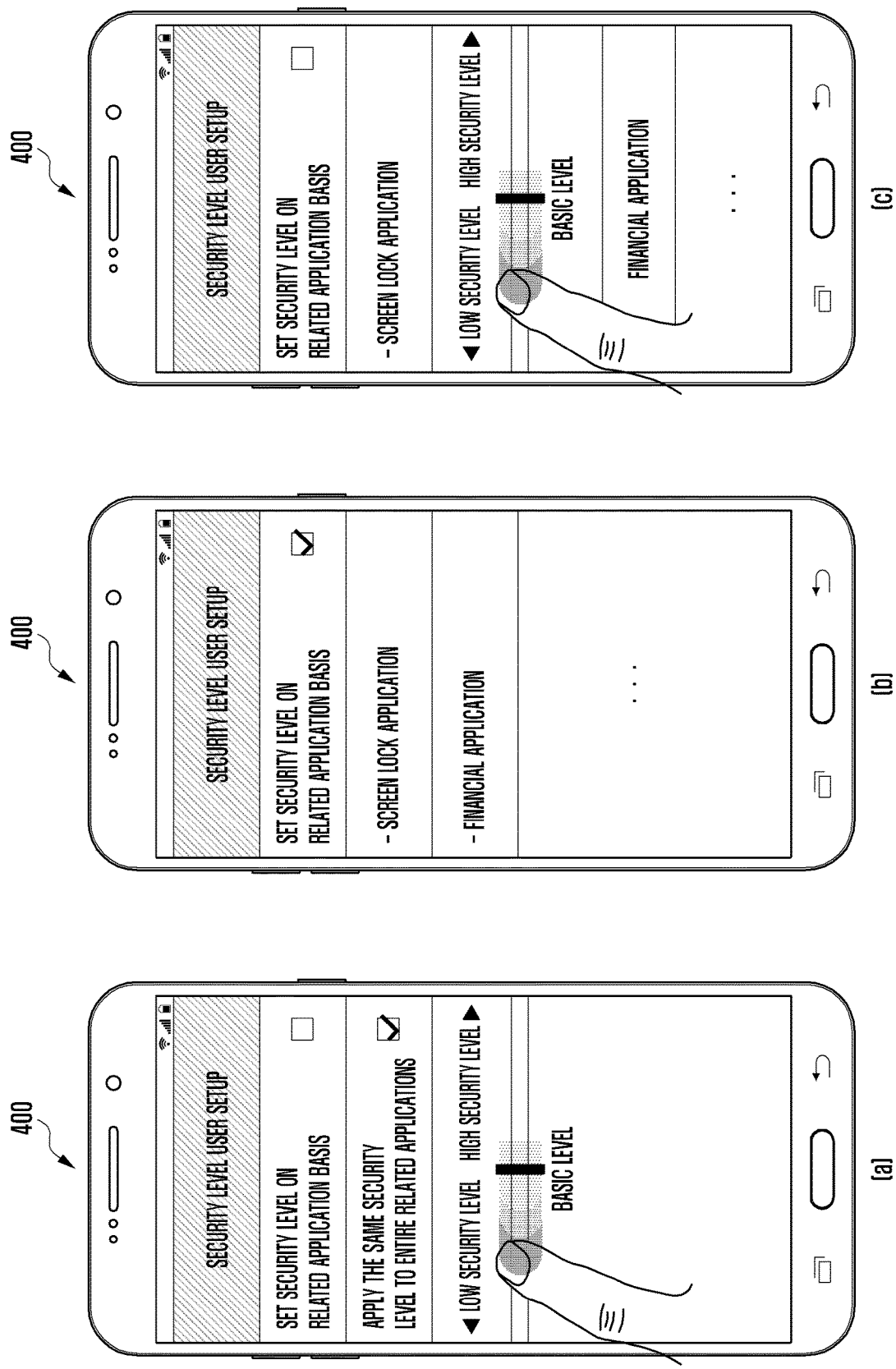
FIG. 18 is a diagram of a method for setting a fingerprint related security level of an electronic device, according to an embodiment.

FIG. 18 is a diagram of a method for setting a fingerprint related security level of an electronic device, according to an embodiment of the disclosure.

With reference to FIG. 18 at (a)-(c), the processor 440 of the electronic device 400 may differently set a security level of a newly updated fingerprint information template and a fingerprint information template previously registered in the memory 430.

The processor 440 may set a security level of a newly updated fingerprint information template to a low security level and set a security level of a fingerprint information template previously registered in the memory 430 to a high security level. The processor 440 may set a different security level to each application executed in the electronic device 400 (at (a) of FIG. 18).

The processor 440 may set a security level of a screen lock application of the electronic device 400 to a low security level and set a security level of a financial application to a high security level (at (b) and (c) of FIG. 18).

When fast identity online (FIDO) authentication is required, the processor 440 may set a security level of the application to a high security level. When fingerprint authentication of an application set to a high security level is performed, the processor 440 may not use an updated fingerprint information template for fingerprint authentication. The user of the electronic device 400 may set a different security level to each application. When the user of the electronic device 400 changes a security level of a screen lock application to a low security level, the processor 440 may use an updated fingerprint information template as registration information for fingerprint authentication.

Figure 19:
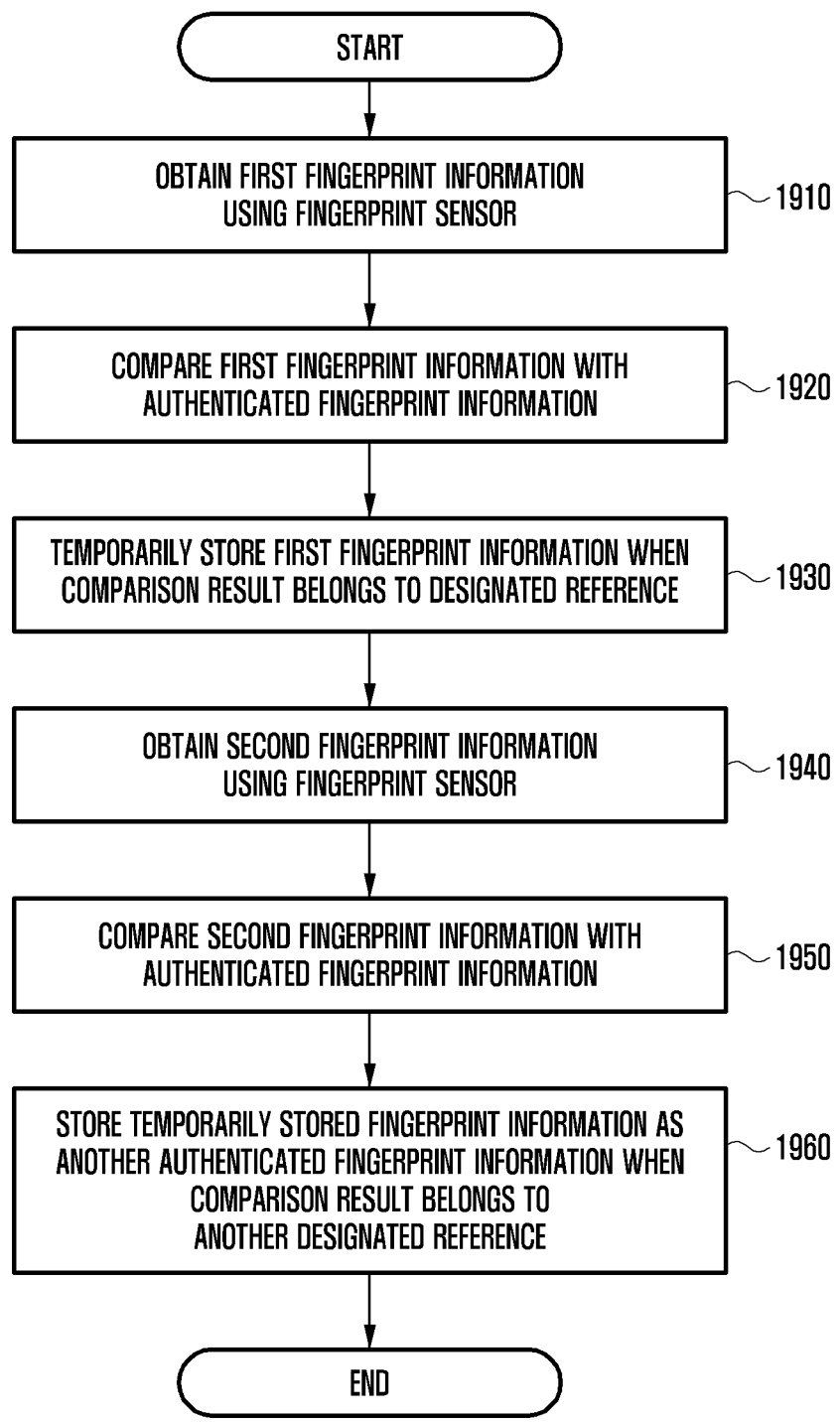
FIG. 19 is a flowchart of a method for controlling fingerprint information in an electronic device, according to an embodiment.

FIG. 19 is a flowchart of a method for controlling fingerprint information in an electronic device, according to an embodiment of the disclosure.

The processor 440 may obtain first fingerprint information corresponding to a first input received using the fingerprint sensor 422 at step 1910.

The processor 440 may compare the obtained first fingerprint information with user authenticated (e.g., registered) fingerprint information stored in the memory 430 in relation to user authentication at step 1920.

When a comparison result belongs to a designated reference (e.g., when a matching rate is 75% or more and less than 80%), the processor 440 may temporarily store the first fingerprint information in the memory 430 at step 1930.

The processor 440 may obtain second fingerprint information corresponding to a second input received using the fingerprint sensor 422 at step 1940.

The processor 440 may compare the obtained second fingerprint information with user authenticated (e.g., registered) fingerprint information stored in the memory 430 at step 1950.

When the comparison result belongs to another designated reference (e.g., a matching rate of 80% or more), the processor 440 may store the first fingerprint information temporarily stored in the memory 430 as user another authenticated fingerprint information at step 1960.

Figure 20:
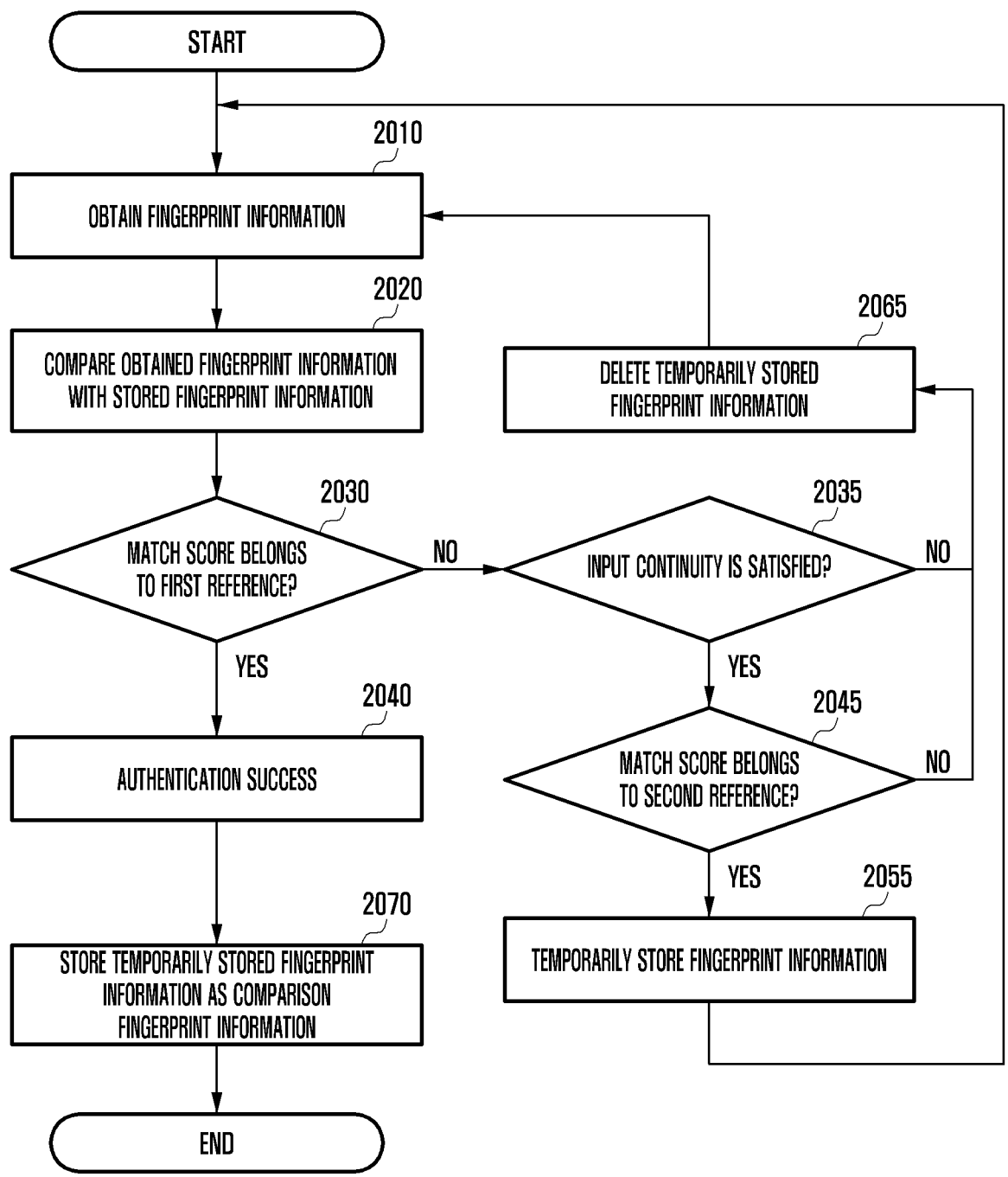
FIG. 20 is a flowchart of a method for controlling fingerprint information in an electronic device, according to an embodiment.

FIG. 20 is a flowchart of a method for controlling fingerprint information in an electronic device, according to an embodiment of the disclosure.

The processor 440 may obtain fingerprint information of a user of the electronic device 400 using the fingerprint sensor 422 at step 2010.

The processor 440 may compare the obtained fingerprint information with user authenticated fingerprint information stored and registered in the memory 430 at step 2020.

The processor 440 may determine whether a match score (e.g., a matching rate) of the obtained fingerprint information and user authenticated fingerprint information stored in the memory 430 belongs to a first reference (e.g., a matching rate of 80% or more) at step 2030.

If a match score of the obtained fingerprint information and user authenticated fingerprint information stored in the memory 430 belongs to a first reference, the processor 440 may perform (e.g., lock release or user authentication) a function corresponding to authentication success. Further, the processor 440 may provide a notification representing authentication success according to authentication success at step 2040.

If a match score of the obtained fingerprint information and user authenticated fingerprint information stored in the memory 430 does not belong to a first reference, the processor 440 may determine whether input continuity of fingerprint information is satisfied at step 2035.

For example, the input continuity may include input continuity of a touch input to the fingerprint sensor 422 or input continuity of a touch input time.

If input continuity of fingerprint information is satisfied, the processor 440 may determine whether a match score (e.g., a matching rate) of the obtained fingerprint information and user authenticated fingerprint information stored in the memory 430 belongs to a second reference (e.g., a matching rate of 75% or more) at step 2045.

If a match score of the obtained fingerprint information and user authenticated fingerprint information stored in the memory 430 belongs to a second reference, the processor 440 may temporarily store the obtained fingerprint information in the memory 430 at step 2055.

If input continuity of fingerprint information is not satisfied, the processor 440 may delete fingerprint information related to user authentication temporarily stored in the memory 430 at step 2065. Further, if a match score of the obtained fingerprint information and user authenticated fingerprint information stored in the memory 430 does not belong to a second reference, the processor 440 may delete fingerprint information related to user authentication temporarily stored in the memory 430 at step 2065.

When fingerprint authentication is succeeded through the obtained fingerprint information at step 2040, the processor 440 may store the temporarily stored fingerprint information as fingerprint information that can compare with fingerprint information to be input through the fingerprint sensor 422 in the memory 430 at step 2070.

When authentication of the obtained fingerprint information is succeeded, the processor 440 may store user fingerprint information previously stored in the memory 430 at an index (e.g., a thumb finger=index 1, an index finger=index 2) of a template (each fingerprint image within an index, e.g., a template 1 (a right image of a thumb finger), a template 2 (a left image of a thumb finger)) used for a match score and store the obtained fingerprint information as a template 3. The processor 440 may classify the stored index and another exceptional index and store the indexes in the memory 430.

After authentication success at step 2040, the processor 440 may determine whether a fingerprint information input of the designated number or more occurs. When fingerprint information input of the designated number or more occurs, the processor 440 may store temporarily stored fingerprint information as comparison fingerprint information. When an input of fingerprint information does not satisfy the designated number, the processor 440 may not store temporarily stored fingerprint information as comparison fingerprint information.

Figure 21:
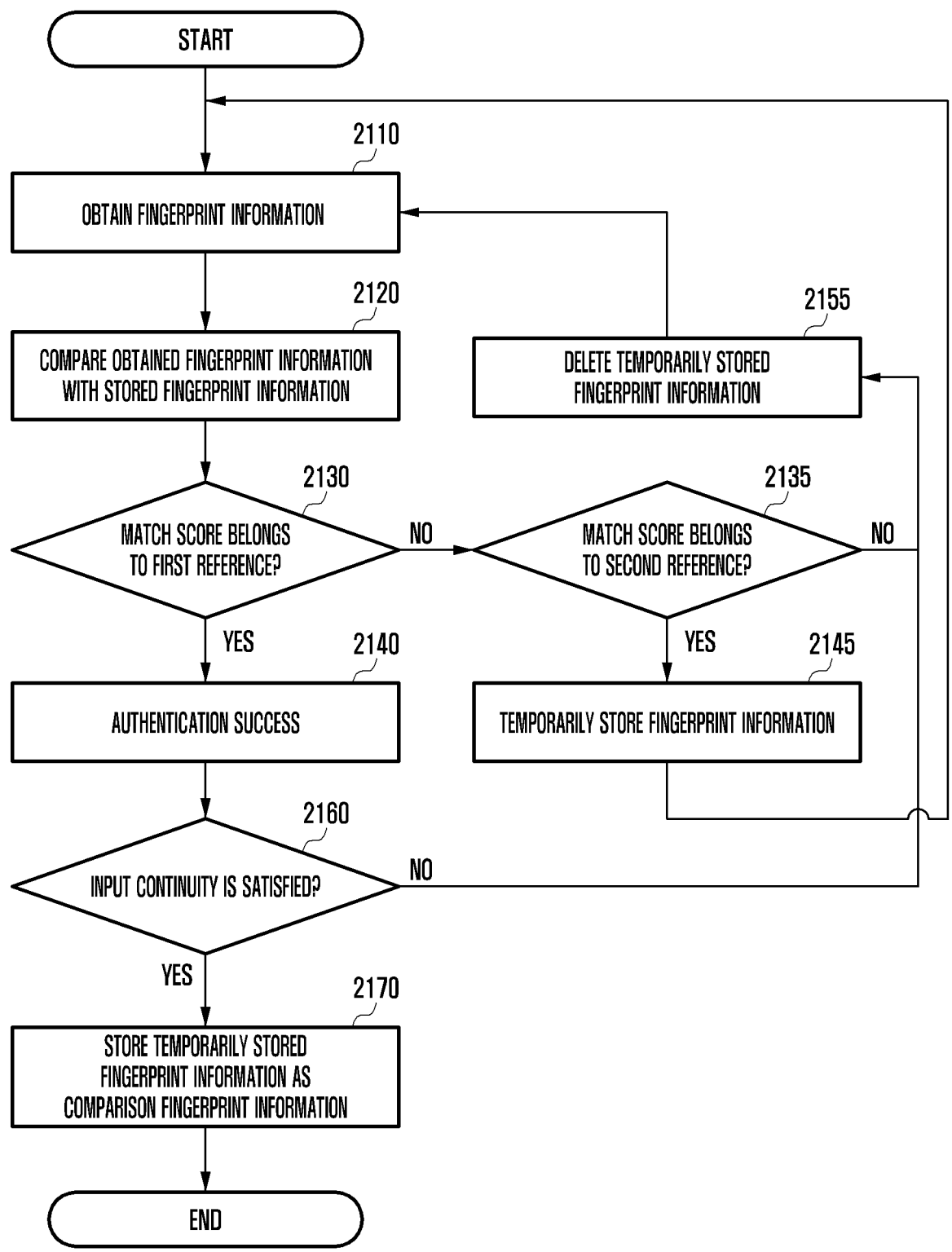
FIG. 21 is a flowchart of a method for controlling fingerprint information in an electronic device, according to an embodiment.

FIG. 21 is a flowchart of a method for controlling fingerprint information in an electronic device, according to an embodiment of the disclosure.

The processor 440 may obtain fingerprint information of a user of the electronic device 400 using the fingerprint sensor 422 at step 2110.

The processor 440 may compare the obtained fingerprint information with user authenticated fingerprint information stored and registered in the memory 430 at step 2120.

The processor 440 may determine whether a match score (e.g., a matching rate) of the obtained fingerprint information and user authenticated fingerprint information stored in the memory 430 belongs to a first reference (e.g., a matching rate of 80% or more) at step 2130.

If a match score of the obtained fingerprint information and user authenticated fingerprint information stored in the memory 430 belongs to a first reference, the processor 440 may provide a notification representing authentication success at step 2140.

If a match score of the obtained fingerprint information does not belong to a first reference, the processor 440 may determine whether a match score (e.g., a matching rate) of the obtained fingerprint information and user authenticated fingerprint information stored in the memory 430 belongs to a second reference (e.g., a matching rate of 75% or more) at step 2135.

If a match score of the obtained fingerprint information and user authenticated fingerprint information stored in the memory 430 belongs to a second reference, the processor 440 may temporarily store the obtained fingerprint information in the memory 430 at step 2145.

If a match score of the obtained fingerprint information and user authenticated fingerprint information stored in the memory 430 does not belong to a second reference, the processor 440 may delete fingerprint information related to user authentication temporarily stored in the memory 430 at step 2155.

The processor 440 may determine whether input continuity is satisfied after authentication success at steps 2140 and 2160.

If input continuity is satisfied, the processor 440 may store the temporarily stored fingerprint information as fingerprint information that can compare with fingerprint information to be input through the fingerprint sensor 422 in the memory 430 at step 2170.

When authentication of the obtained fingerprint information is succeeded, the processor 440 may store user fingerprint information previously stored in the memory 430 at an index (e.g., a thumb finger=index 1, an index finger=index 2) of a template (each fingerprint image within an index, e.g., a template 1 (a right image of a thumb finger), a template 2 (a left image of a thumb finger)) used for a match score and store the obtained fingerprint information as a template 3. The processor 440 may classify the stored index and another exceptional index and store the indexes in the memory 430.

If input continuity is not satisfied, the processor 440 may delete fingerprint information related to user authentication temporarily stored in the memory 430 at step 2155.

When a user fingerprint for authentication of an electronic device is input, by additionally registering fingerprint information in which similarity of an input fingerprint failed in security authentication is greater than or equal to a predetermined threshold value as future comparison fingerprint information to perform authentication, a fingerprint authentication success rate of the user of the electronic device can be enhanced.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
a memory configured to store reference fingerprint information comprising first reference fingerprint information;
a display;
a fingerprint sensor; and
a processor, coupled with the memory, the display, and the fingerprint sensor,
the processor is configured to:
obtain, via the fingerprint sensor, first fingerprint information corresponding to a first input for a first authentication,
obtain a first match score by comparing the first fingerprint information with the first reference fingerprint information,
based on a determination that the first match score is within a first reference range, perform a designated function, and
based on a determination that the first match score is within a second reference range, the second reference range being different from the first reference range:
temporarily store the first fingerprint information in the memory,
obtain, via the fingerprint sensor, second fingerprint information corresponding to a second input for a second authentication,
obtain a second match score by comparing the second fingerprint information with the first reference fingerprint information, and
based on a determination that the second match score is within the first reference range, store the temporarily stored first fingerprint information as second reference fingerprint information of the reference fingerprint information in the memory, and
perform the designated function.

2. The electronic device of claim 1, wherein the processor is further configured to delete the temporarily stored first fingerprint information when the first fingerprint information does not satisfy the first reference range.

3. The electronic device of claim 1, wherein the processor is further configured to determine whether an input time interval satisfies the first reference range, when an input time interval between the first input and the second input is within a designated time interval.

4. The electronic device of claim 1, wherein the display further comprises a touch panel, and
wherein the processor is further configured to determine whether a proximity level satisfies the first reference range when the proximity level belongs to a designated proximity range, until a time point at which the second input is detected after a time point at which the first input is detected using the touch panel.

5. The electronic device of claim 1, further comprising at least one motion sensor, and wherein the processor is further configured to determine whether a movement of the electronic device satisfies the second reference range when the movement of the electronic device belongs to a designated movement range, until a time point at which the second input is detected after a time point at which the first input is detected using the at least one motion sensor.

6. The electronic device of claim 1, wherein the processor is further configured to delete the temporarily stored first fingerprint information when the second authentication does not satisfy the first reference range and the second reference range.

7. The electronic device of claim 1, wherein the processor is further configured to update the first reference fingerprint information based on the second reference fingerprint information when storing the second reference fingerprint information.

8. The electronic device of claim 1, wherein the processor is further configured to display a user interface for storing the second reference fingerprint information through the display before storing the second reference fingerprint information.

9. The electronic device of claim 1, wherein the processor is further configured to determine whether the first fingerprint information or the second fingerprint information belongs to the first reference range, when a comparison result of a first match rate between the first fingerprint information or the second fingerprint information and the first reference fingerprint information is greater than a predetermined value, and
determine whether the first fingerprint information or the second fingerprint information belongs to the second reference range when the comparison result of the first match rate or a second match rate is greater than or less than the predetermined value.

10. A method of controlling fingerprint information in an electronic device comprising a memory configured to store reference fingerprint information comprising first reference fingerprint information, a display, a fingerprint sensor, and a processor coupled with the memory, the display, and the fingerprint sensor, the method comprising:
obtaining, by the processor, via the fingerprint sensor, first fingerprint information corresponding to a first input for a first authentication;
obtaining a match score by comparing, by the processor, the first fingerprint information with the first reference fingerprint information;
performing, by the processor, a designated function, based on a determination that the first match score is within a first reference range; and
based on a determination that the first match score is within a second reference range, the second reference range being different from the first reference range:
temporarily storing, by the processor, the first fingerprint information in the memory;
obtaining, via the fingerprint sensor, second fingerprint information corresponding to a second input for a second authentication;
obtaining a second match score by comparing the second fingerprint information with the first reference fingerprint information;
based on a determination that the second match score is within the first reference range, storing the temporarily stored first fingerprint information as second reference fingerprint information of the reference fingerprint information in the memory; and
performing the designated function.

11. The method of claim 10, further comprising deleting, by the processor, the temporarily stored first fingerprint information when the temporarily stored first fingerprint information does not satisfy the first reference range.

12. The method of claim 10, further comprising determining, by the processor, when an input time interval between the first input and the second input is within a designated time interval, whether the input time interval satisfies the first reference range.

13. The method of claim 10, further comprising determining, by the processor, when a proximity level belongs to a designated proximity range until a time point at which the second input is detected after a time point at which the first input is detected using a touch panel, whether the proximity level satisfies the first reference range.

14. The method of claim 10, further comprising determining, by the processor, when a movement of the electronic device belongs to a second reference range until a time point at which the second input is detected after a time point at which the first input is detected using at least one motion sensor, whether the movement of the electronic device satisfies the second reference range.

15. The method of claim 10, further comprising deleting, by the processor, the temporarily stored first fingerprint information when the second authentication does not satisfy the first reference range and the second reference range.

16. The method of claim 10, further comprising updating, by the processor, the first reference fingerprint information based on the second fingerprint information when storing the second fingerprint information.

17. The method of claim 10, further comprising displaying, by the processor, a user interface configured to store the first fingerprint information through the display before storing the temporarily stored first fingerprint information as the second fingerprint information.

18. The method of claim 10, further comprising:
determining, by the processor, whether the first fingerprint information or the second fingerprint information belongs to the first reference range, when a comparison result of a first match rate of the first fingerprint information or the second fingerprint information and the first reference fingerprint information is greater than or equal to a predetermined value; and
determining, by the processor, whether the first fingerprint information or the second fingerprint information belongs to the second reference range when the comparison result of the first match rate or a second match rate is greater than or less than the predetermined value.

19. A nontransitory computer readable recording medium having stored thereon instructions that when executed cause an electronic device comprising a memory configured to store reference fingerprint information comprising first reference fingerprint information, a display, a fingerprint sensor, and a processor, coupled with the memory, the display, and the fingerprint sensor, the processor being to perform a method comprising:
obtaining, by the processor, via the fingerprint sensor, first fingerprint information corresponding to a first input for a first authentication;
obtaining a first match score by comparing, by the processor, the first fingerprint information with the first reference fingerprint information;
performing, by the processor, a designated function, based on a determination that the first match score is within a first reference range; and based on a determination that the first match score is within a second reference range, the second reference range being different from the first reference range:
temporarily storing, by the processor, the first fingerprint information in the memory;
obtaining, via the fingerprint sensor, second fingerprint information corresponding to a second input for a second authentication,
obtaining a second match score by comparing the second fingerprint information with the first reference fingerprint information, and
based on a determination that the second match score is within the first reference range, storing the temporarily stored first fingerprint information as second reference fingerprint information of the reference fingerprint information in the memory, and
performing the designated function.

* * * * *